(12) United States Patent
Durand et al.

(10) Patent No.: US 9,539,762 B2
(45) Date of Patent: Jan. 10, 2017

(54) 3D PRINTING WITH KINEMATIC COUPLING

(71) Applicant: MarkForged, Inc., Somerville, MA (US)

(72) Inventors: Keith Durand, Somerville, MA (US); Rick Bryan Woodruff, Cambridge, MA (US); Gregory Thomas Mark, Cambridge, MA (US)

(73) Assignee: MARKFORGED, INC., Cambridge, MA (US)

( * ) Notice: Subject to any disclaimer, the term of this patent is extended or adjusted under 35 U.S.C. 154(b) by 0 days.

(21) Appl. No.: 14/605,752

(22) Filed: Jan. 26, 2015

(65) Prior Publication Data

US 2015/0210007 A1    Jul. 30, 2015

Related U.S. Application Data

(63) Continuation-in-part of application No. 14/491,439, filed on Sep. 19, 2014, which is a continuation-in-part
(Continued)

(51) Int. Cl.
*B29C 47/92* (2006.01)
*B29C 67/00* (2006.01)
(Continued)

(52) U.S. Cl.
CPC ....... *B29C 67/0051* (2013.01); *B29C 67/0055* (2013.01); *B29C 70/16* (2013.01);
(Continued)

(58) Field of Classification Search
CPC .. B29C 67/0051; B29C 67/0055; B29C 70/16; B33Y 10/00
(Continued)

(56) References Cited

U.S. PATENT DOCUMENTS 5,002,712 A    3/1991    Goldmann et al.
5,037,691 A    8/1991    Medney et al.
(Continued)

FOREIGN PATENT DOCUMENTS

DE    4102257 A1    7/1992
KR    100995983 B1    11/2010
(Continued)

OTHER PUBLICATIONS

Slocum, Alexander. "Kinematic Couplings: A Review of Design Principles and Applications." International Journal of Machine Tools and Manufacture 50.4 (2010): 310-327.*
(Continued)

*Primary Examiner* — Joseph S. Del Sole
*Assistant Examiner* — John Robitaille
(74) *Attorney, Agent, or Firm* — Lando & Anastasi, LLP

(57) ABSTRACT

A three dimensional printer incorporates a kinematic coupling between the build platform and movable stage which holds the build platform, of three curved protrusions attached to one of the build platform or the movable stage and six locating features formed in receivers of the other. At least two flexures differentially change a Z position of each of two of the curved protrusions. 3D printing is paused at a preset level of completion, and the build platform may be removed for external operations. A print resume circuit resumes printing of additional printed layers at the previous position in response to a return detection circuit that responds to an input (e.g., a touch screen confirmation).

14 Claims, 18 Drawing Sheets

Related U.S. Application Data of application No. 14/297,437, filed on Jun. 5, 2014, now Pat. No. 9,370,896, and a continuation-in-part of application No. 14/222,318, filed on Mar. 21, 2014, and a continuation-in-part of application No. 14/333,881, filed on Jul. 17, 2014, now Pat. No. 9,149,988.

(60) Provisional application No. 61/931,698, filed on Jan. 27, 2014, provisional application No. 61/907,431, filed on Nov. 22, 2013, provisional application No. 61/902,256, filed on Nov. 10, 2013, provisional application No. 61/883,440, filed on Sep. 27, 2013, provisional application No. 61/881,946, filed on Sep. 24, 2013, provisional application No. 61/880,129, filed on Sep. 19, 2013, provisional application No. 61/878,029, filed on Sep. 15, 2013, provisional application No. 61/847,113, filed on Jul. 17, 2013, provisional application No. 61/831,600, filed on Jun. 5, 2013, provisional application No. 61/815,531, filed on Apr. 24, 2013, provisional application No. 61/804,235, filed on Mar. 22, 2013.

(51) Int. Cl.

| | | |
|---|---|---|
| *B29C 70/16* | (2006.01) | |
| *B33Y 10/00* | (2015.01) | |
| *B29L 9/00* | (2006.01) | |
| *B29K 63/00* | (2006.01) | |
| *B29K 71/00* | (2006.01) | |
| *B29K 77/00* | (2006.01) | |
| *B29K 79/00* | (2006.01) | |
| *B29K 25/00* | (2006.01) | |
| *B33Y 50/02* | (2015.01) | |

(52) U.S. Cl.
CPC .......... *B33Y 10/00* (2014.12); *B29C 67/0088* (2013.01); *B29K 2025/08* (2013.01); *B29K 2063/00* (2013.01); *B29K 2071/00* (2013.01); *B29K 2077/00* (2013.01); *B29K 2079/085* (2013.01); *B29L 2009/00* (2013.01); *B33Y 50/02* (2014.12)

(58) Field of Classification Search
USPC .......................................................... 425/150
See application file for complete search history.

(56) References Cited

U.S. PATENT DOCUMENTS

| | | | |
|---|---|---|---|
| 5,340,433 A | | 8/1994 | Crump |
| 5,866,058 A | | 2/1999 | Batchelder et al. |
| 5,936,861 A | | 8/1999 | Jang et al. |
| 6,153,034 A | | 11/2000 | Lipsker |
| 6,363,606 B1 | | 4/2002 | Johnson, Jr. et al. |
| 6,934,600 B2 | | 8/2005 | Jang et al. |
| 7,127,309 B2 | * | 10/2006 | Dunn et al. ..................... 700/98 |
| 8,221,669 B2 | | 7/2012 | Batchelder et al. |
| 2002/0009935 A1 | | 1/2002 | Hsiao et al. |
| 2002/0062909 A1 | | 5/2002 | Jang et al. |
| 2002/0079607 A1 | | 6/2002 | Hawley et al. |
| 2002/0113331 A1 | | 8/2002 | Zhang et al. |
| 2002/0165304 A1 | | 11/2002 | Mulligan et al. |
| 2003/0044593 A1 | | 3/2003 | Vaidyanathan et al. |
| 2003/0056870 A1 | | 3/2003 | Comb et al. |
| 2003/0090034 A1 | | 5/2003 | Mulhaupt et al. |
| 2003/0186042 A1 | | 10/2003 | Dunlap et al. |
| 2003/0236588 A1 | | 12/2003 | Jang et al. |
| 2005/0061422 A1 | | 3/2005 | Martin |
| 2005/0104257 A1 | | 5/2005 | Gu et al. |
| 2005/0109451 A1 | | 5/2005 | Hauber et al. |
| 2005/0230029 A1 | | 10/2005 | Vaidyanathan et al. |
| 2007/0003650 A1 | | 1/2007 | Schroeder |
| 2007/0228592 A1 | | 10/2007 | Dunn et al. |
| 2008/0176092 A1 | | 7/2008 | Owens |
| 2009/0095410 A1 | | 4/2009 | Oldani |
| 2009/0174709 A1 | * | 7/2009 | Kozlak et al. ................. 345/420 |
| 2011/0032301 A1 | | 2/2011 | Fienup et al. |
| 2011/0143108 A1 | | 6/2011 | Fruth et al. |
| 2011/0222081 A1 | | 9/2011 | Yi et al. |
| 2011/0289791 A1 | | 12/2011 | Menchik et al. |
| 2012/0060468 A1 | | 3/2012 | Dushku et al. |
| 2012/0231225 A1 | | 9/2012 | Mikulak et al. |
| 2012/0247655 A1 | | 10/2012 | Erb et al. |
| 2013/0004610 A1 | | 1/2013 | Hartmann et al. |
| 2013/0164498 A1 | | 6/2013 | Langone et al. |
| 2013/0209600 A1 | | 8/2013 | Tow |
| 2013/0233471 A1 | | 9/2013 | Kappesser et al. |
| 2013/0327917 A1 | | 12/2013 | Steiner et al. |
| 2013/0337256 A1 | | 12/2013 | Farmer et al. |
| 2013/0337265 A1 | | 12/2013 | Farmer |
| 2014/0061974 A1 | | 3/2014 | Tyler |
| 2014/0120197 A1 | | 5/2014 | Swanson et al. |
| 2014/0159284 A1 | | 6/2014 | Leavitt |
| 2014/0175706 A1 | | 6/2014 | Kritchman |
| 2014/0268604 A1 | | 9/2014 | Wicker et al. |
| 2014/0287139 A1 | | 9/2014 | Farmer et al. |
| 2014/0291886 A1 | | 10/2014 | Mark et al. |
| 2014/0328963 A1 | | 11/2014 | Mark et al. |
| 2014/0328964 A1 | | 11/2014 | Mark et al. |
| 2014/0361460 A1 | | 12/2014 | Mark |
| 2015/0037446 A1 | | 2/2015 | Douglass et al. |
| 2015/0165666 A1 | | 6/2015 | Butcher et al. |

FOREIGN PATENT DOCUMENTS

| | | |
|---|---|---|
| KR | 101172859 B1 | 8/2012 |
| WO | 2013017284 A2 | 2/2013 |

OTHER PUBLICATIONS

International Search Report and Written Opinion for PCT/US2015/012956 dated Apr. 15, 2015.
Ahn et al., Anisoptropic material properties of fused deposition modeling ABS, Rapid Prorotyping vol. 8, No. 4, 2002, pp. 248-257.
August et al., Recent Developments in Automated Fiber Placement of Thermoplastic Composites, SAMPE Technical Conference Proceedings, Wichita, KS, Oct. 23, 2013.
Dell'Anno et al., Automated Manufacture of 3D Reinforced Aerospace Composite Structures, International Journal of Structural Integrity, 2012, vol. 3, Iss 1, pp. 22-40.
Devleig et al., High-Speed Fiber Placement on Large Complex Structures, No. 2007-01-3843. SAE International 2007.
Hasenjaeger, Programming and Simulating Automated Fiber Placement (AFP) CNC Machines, SAMPE Journal, vol. 49, No. 6, Nov./Dec. 2013.
Hossain et al, Improving Tensile Mechanical Properties of FDM-Manufactured Specimens via Modifying Build Parameters, Proceedings of Solid Freeform Fabrication Symposium, Austin, Texas, Aug. 16, 2013.
Lamontia et al, "Contoured Tape Laying and Fiber Placement Heads for Automated Fiber Placement of Large Composite Aerospace Structures," 34th ISTC, Baltimore, Md, Nov. 4-7, 2002.
Mondo et al., Overview of Thermoplastic Composite ATL and AFP Technologies, ITHEC 2012, Oct. 30, 2012, Messe Bremen, Germany.
Rower, Robot Driven Automatic Tapehead for Complex Composite Lay-ups, No. 10AMAF-0066, SAE International 2010, Aerospace Manufacturing and Automated Fastening Conference & Exhibition, Sep. 28, 2010.
Zieman et al., Anisotropic Mechanical Properties of ABS Parts Fabricated by Fused Deposition Modelling, INTECH Open Access Publisher, 2012.

* cited by examiner

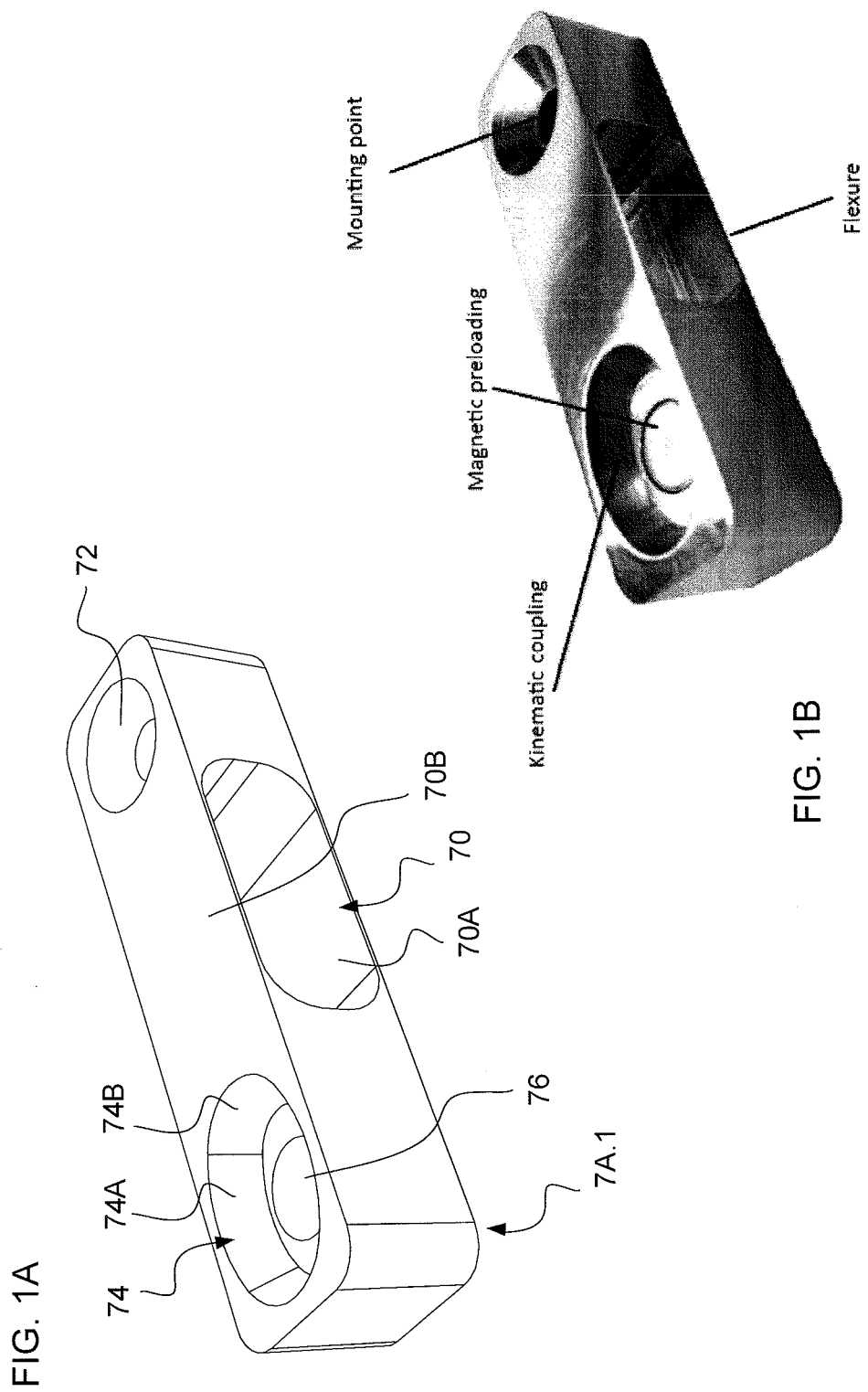

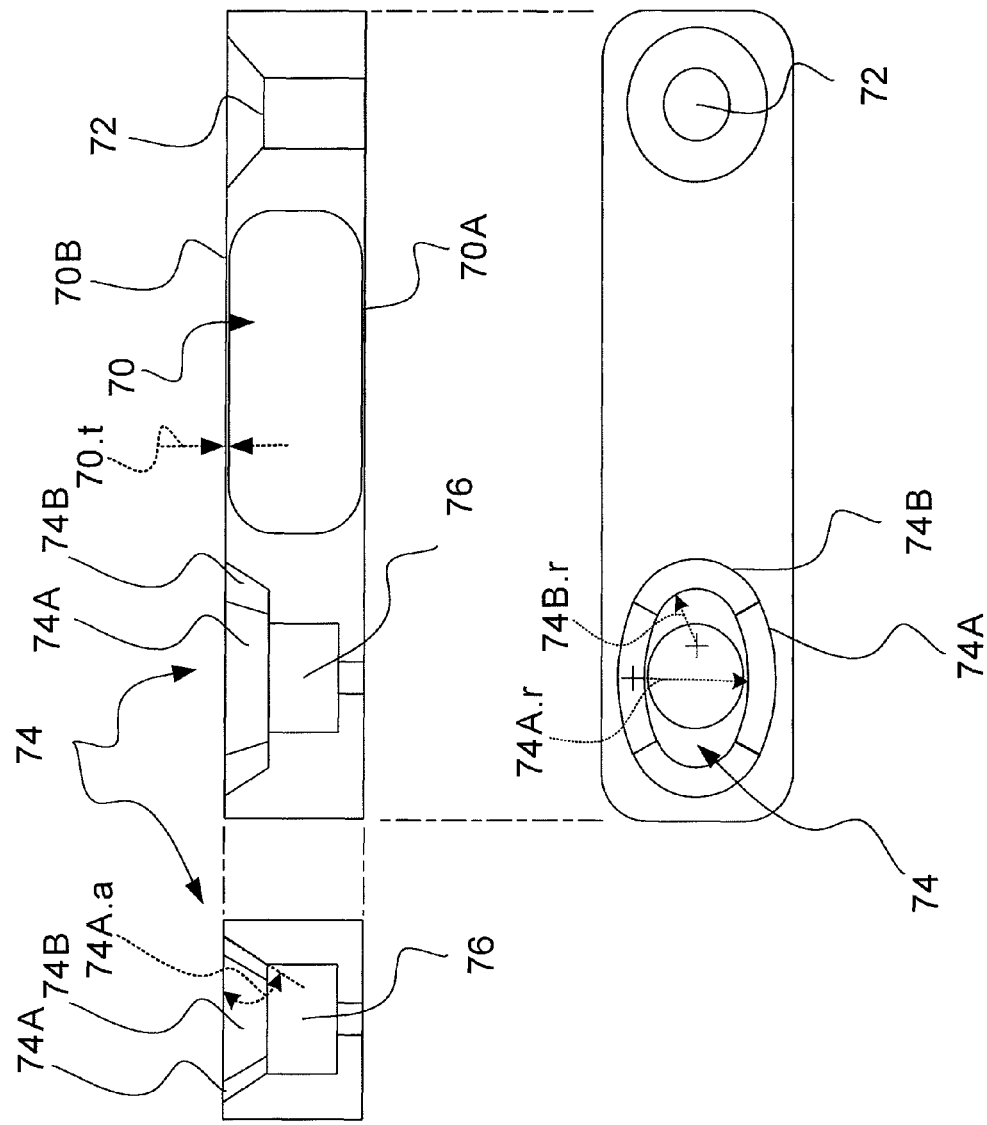

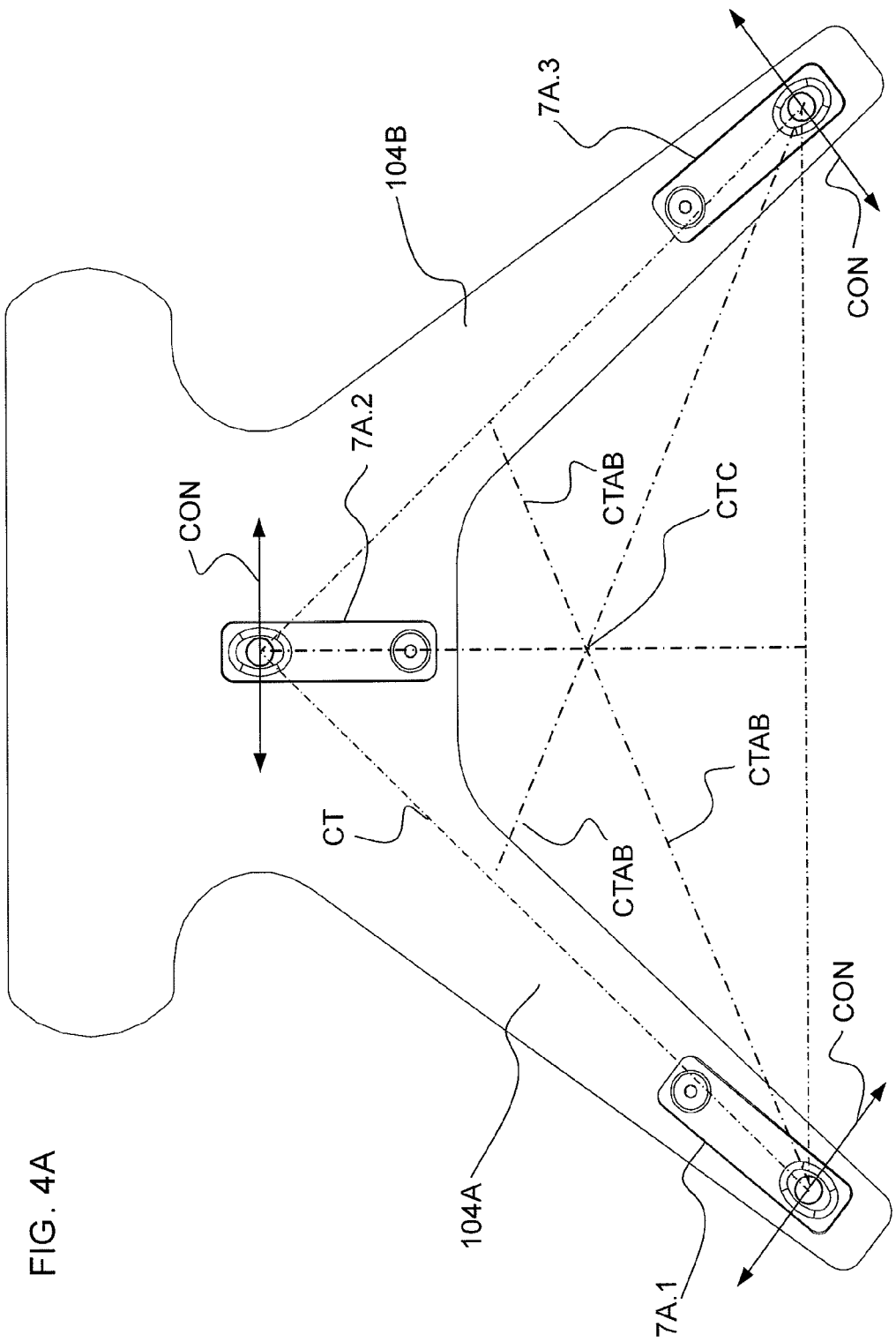

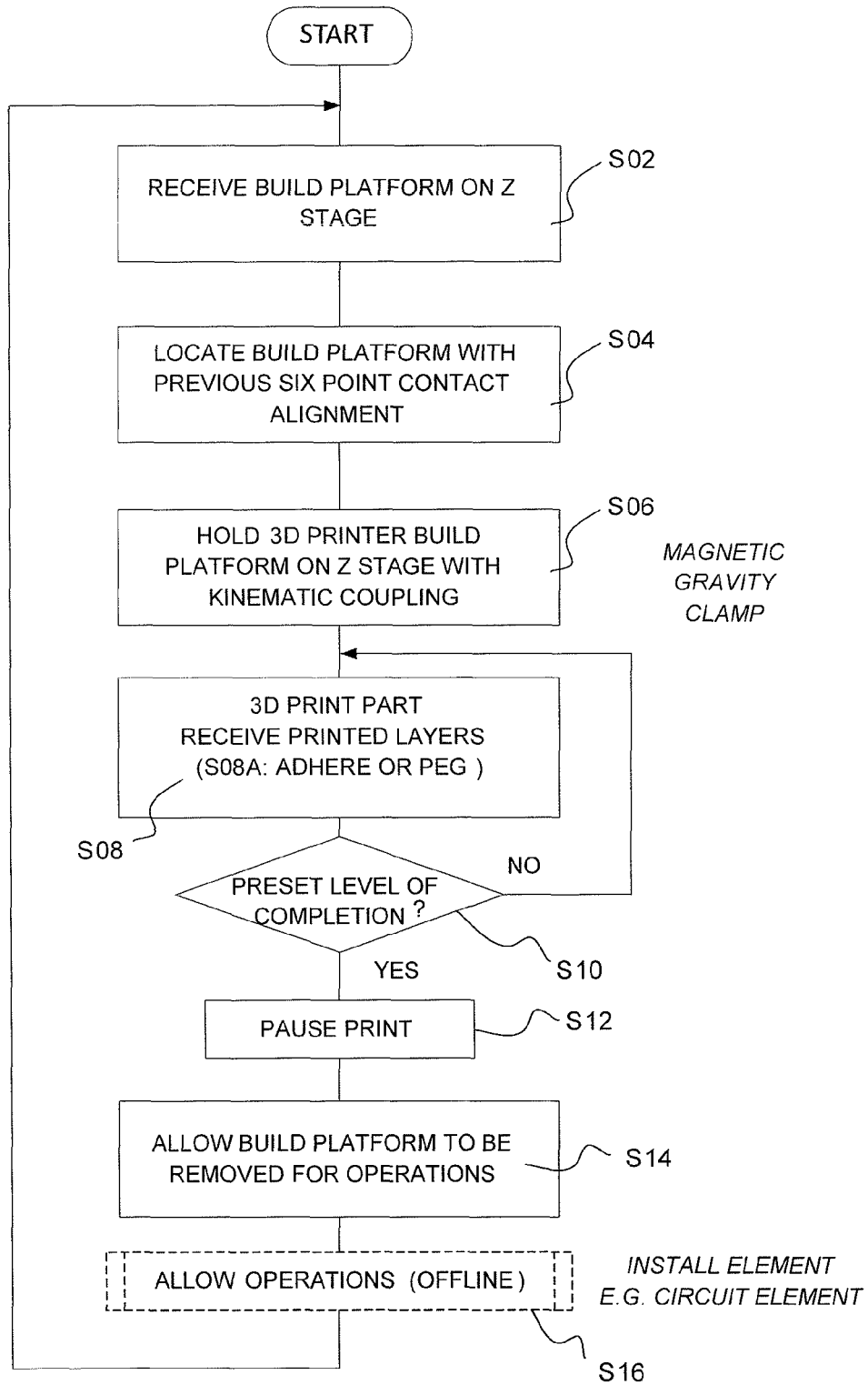

3D PRINTING WITH KINEMATIC COUPLING

CROSS REFERENCE TO RELATED APPLICATIONS

This application is a continuation-in-part of U.S. application Ser. No. 14/491,439, filed Sep. 19, 2014, and claims the benefit under 35 U.S.C. §119 §of U.S. provisional Application No. 61/931,698, filed Jan. 27, 2014, the disclosures of which are incorporated herein by reference in their entireties. The disclosures of U.S. provisional application Ser. Nos. 61/804,235; 61/815,531; 61/831,600; 61/847,113; 61/878,029; 61/880,129; 61/881,946; 61/883,440; 61/902,256; 61/907,431; 62/080,890; 14/222,318; 14/297,437; and 14/333,881 are herein incorporated by reference in their entireties.

FIELD

Aspects relate to three dimensional printing.

BACKGROUND

Since the initial development of three dimensional printing, also known as additive manufacturing, various types of three dimensional printing for building a part layer-by-layer have been conceived. For example, Stereolithography (SLA) produces high-resolution parts. However, parts produced using SLA typically are not durable and are also often not UV-stable and instead are typically used for proof-of-concept work. In addition to SLA, Fused Filament Fabrication (FFF) three dimensional printers are also used to build parts by depositing successive filament beads of acrylonitrile butadiene styrene (ABS), or a similar polymer.

One of the inherent problems of 3D printing is maintaining a level build platform with relation to the print head. The prior art solutions have employed processes to re-level the print platform, some of which include adjusting the build platform before a print, or scanning the build platform to determine the actual position before each print. This solution, however, adds cost and complexity to the printing process.

Another approach to printing in the presence of an imprecise build platform is to soak up the alignment mismatch by building a disposable part below the actual part to take up the misalignment between the print head and the build plate. This approach wastes material, driving up costs and print times. Moreover, it requires the build platform to stay in one place during the entire print. If the user removes the platform, and reinstalls it, the original leveling may be substantially off.

SUMMARY

According to a one embodiment and/or aspect of the present invention, a three dimensional printer includes a build platform for receiving a part deposited by a three dimensional printing process and a movable stage supporting the build platform. A kinematic coupling is positioned between the build platform and movable stage which holds said build platform. The kinematic coupling includes three curved protrusions attached to one of the build platform or the movable stage. Six locating features are formed in receivers of the remaining one of the build platform and the movable stage. The protrusions and locating features provide six points of contact between the curved protrusions and the locating features. At least two flexures are provided. One flexure is operative with respect to each of two of the three curved protrusions attached to differentially change a Z position of at least one of the points of contact. A print pause circuit pauses three dimensional printing when a completion level detection circuit responds to a preset level of completion of a part to activate the print pause circuit. A removal circuit responds to the print pause circuit to present the build platform to be removed. A print resume circuit that resumes printing of additional printed layers. A return detection circuit that responds to an input associated with the return of the build platform to activate the print resume circuit.

As discussed herein, "circuit" means an electrical circuit, but is also inclusive of executable instructions executed by a programmable computer. For example, the print resume circuit may be a set of instructions executed by a microprocessor that in turn is connected to electrical circuits controlling motors for printing.

Optionally, one or more of the three curved protrusions is at least part of a semi-sphere, especially where it may contact the locating surface. Further optionally, the six locating features comprise three two-point locating features, e.g., two locating features for each protrusion. Further optionally, at least one normal to one of the six points of contact is oriented in a direction other than perpendicular to a centroid of a coupling triangle among the three curved protrusions. That is, for example, at least one of the receiving grooves is arranged in other than its most stable arrangement, for compactness or to enable easier loading of the build platform. In an alternative configuration, the six locating features comprise one three or more point locating feature, one two point locating feature, and one single point locating feature. The three or more point locating feature may be three-side, four-sided, or a cone. Optionally, exactly three at least curved protrusions are arranged in a non-equilateral triangle in a plane, so that the build platform may only be inserted in one orientation.

In addition or in the alternative, each of the three curved protrusions is arranged to be, in a coupled position, no more than substantially ½ mm from a rare earth magnet arranged among the six locating features, each rare earth magnet having a pulling force gradient over 5 mm distance from 0 to 0.2 lb. of force at 5 mm to 1 to 3 lb. of force at 0 mm or contact, the rare earth magnet pulling the protrusions into a preload condition and giving tactile and auditory feedback by emphasizing a contact impact as a click. Optionally, the protrusions are held in the preload condition by gravity in addition to by the rare earth magnets.

In an alternative or additional structure, each of the three curved protrusions attached to one of the build platform or the movable stage is configured and arranged to mate with, upon the remaining one of the build platform or the movable stage, a grooved receiving member. The grooved receiving member may have two coupling surfaces joined by two guiding surfaces, the two coupling surfaces being locating features providing two points of contact, and the two guiding surfaces being approximately perpendicular and adjacent to the two coupling surfaces. In one embodiment or aspect of the invention, a method of performing multi-step operations on an article with a 3D printer includes receiving a build platform on a movable stage, and locating the build platform to the movable stage with a six point contact alignment between three curved protrusions and six locating features. Movement of at least two of the three curved protrusions is constrained using at least two individual flexures each constructed to flex two leaves in parallel to constrain movement of a corresponding one of the three curved protrusions to move substantially only in the Z height direction. The build platform is held on the movable stage to the kinematic coupling to receive printed layers of the article on the build platform. The controller or circuit checks whether the 3D printed layers of the article have reached a preset level of completion; and pauses the receiving of 3D printed layers when the preset level of completion is reached. The build platform is made available for removing, and is removed from the build platform and from the six point contact alignment for operations outside the movable stage. After the operations outside the movable stage, the build platform is returned to the six point contact alignment. 3D printing of additional layers is resumed without further adjusting the Z height of any of the three curved protrusions.

Optionally, the build platform may be leveled by adjusting a Z height of the at least two of the three curved protrusions or by reindexing the build platform to a Cartesian origin in at least two of X, Y, and Z directions before resuming the 3D printing of additional layers without further adjusting the Z height of any of the three curved protrusions.

Optionally, the process may include receiving a functional insert as well as data representative of a location of gluing operations which deposit material to affix the functional insert to the article. Material may be deposited in the location of gluing operations to affix the functional insert to the article. Printing may then be resumed by continuing to receive printed layers of the article on the build platform. Optionally, the functional insert is instead overmolded, or an inner or outer contour of the functional insert is followed and material deposited adjacent thereto to secure it to the part.

In one method of performing multi-step operations on an article with a 3D printer, a build platform is received on a movable stage and located to the movable stage with a kinematic coupling. The build platform is preloading on the movable stage to the kinematic coupling, and printed layers of the article are received on the build platform. The controller of the printer checks whether the 3D printed layers of the article have reached a preset level of completion, and if so pauses the receiving of 3D printed layers when the preset level of completion is reached. The build platform is presented to receive a functional insert, and the printer (in no particular order with the remaining steps) receives data representative of a location of gluing operations which deposit material to affix the functional insert to the article. Material is then deposited in the location of gluing operations to affix the functional insert to the article. Printing then may continue to receive printed layers of the article on the build platform.

Optionally the build platform is presented by moving the movable stage to a position where the build platform is not obstructed from being removed outside the movable stage to receive the functional insert. Optionally, depositing material in the location of gluing operations may include depositing material without moving a depositing print head in either of X or Y directions. Alternatively, depositing material in the location of gluing operations may include depositing material in locations that do not interfere within the solid volume of the article, but attach the functional insert to the interior or exterior of the article. Still further optionally, material may be deposited in the location of gluing operations by moving a printhead in the Z direction while depositing material to fill a cavity; or by depositing material to adhere to the functional insert in the shape of one of an inner or an outer contour of the functional insert.

In addition or in the alternative, depositing material in the location of gluing operations may be carried out by depositing material through holes formed in the functional insert after the functional insert has been received has adhere the functional insert via the holes formed in the functional insert; or by depositing material to form a protrusion fitting holes formed in the functional insert before the functional insert has been received to adhere the functional insert via the holes formed in the functional insert.

In one embodiment or structure of a three dimensional printer according to the invention, the printer includes a movable stage, a removable build platform, and a first set of kinematic coupling members upon the removable build platform. A second set of adjustable kinematic coupling members associated with the movable stage, the first and second set of kinematic coupling members being matched to form a kinematic coupling of six points of contact between the build platform and the movable stage. The adjustment may be carried out by at least two Z adjustment mechanisms provided to adjust the second set of kinematic coupling members, each of the at least two Z direction adjustment mechanisms being operative with respect to at least two of the six points of contact to differentially change a Z position of the respective at least two points of contact. The first set of kinematic coupling members upon the removable build platform may be rigid and unitary (e.g., securely and/or permanently affixed) to the build platform, retaining relative position and external shape when removed from the movable stage and when coupled to the movable stage. As such, the first set of kinematic coupling members may be configured in an accessible position to be available and matchable with a third set of adjustable kinematic coupling members external to the three dimensional printer. In this manner, the first set of rigid, unitary to the build platform kinematic coupling members may be configured to be shared between the second set of kinematic coupling members of the movable stage of the printer and a third set of adjustable kinematic coupling members. The build platform may be moved back and forth between the movable stage and the external kinematic coupling, and will remain stable and level every time it is moved.

BRIEF DESCRIPTION OF DRAWINGS

FIGS. 1A through 1C are views of a kinematic coupling flexure member for use with a 3D printer movable stage and build platform, in which FIG. 1A is a perspective view, FIG. 1B is a perspective photograph, and FIG. 1C is an orthogonal view set.

FIGS. 2A and 2B are views of a kinematic coupling flexure member in use at the end of a supporting arm of a movable stage of a 3D printer, in which FIG. 2A is a perspective view, and FIG. 2B is a perspective photograph.

FIGS. 3A through 3C are views of a set of three kinematic coupling flexure members in use at the end of a supporting arms of a movable stage of a 3D printer, together with corresponding curved protrusions for the build platform, in which FIG. 3A is a perspective view, FIG. 3B is a perspective photograph, and FIG. 3C is an exploded perspective view.

FIGS. 4A through 4C are plan views of a set of three kinematic coupling flexure members in use at the end of a supporting arms of a movable stage of a 3D printer, in which FIG. 4A is a plan view of a rounded groove member kinematic coupling set, FIG. 4B is a plan view of a straight groove member kinematic coupling set, FIG. 4C is a plan view of a flat member, straight groove member, and three surface member kinematic coupling set.

FIG. 7 is a flow chart for a process of using a kinematic and/or flexure coupling set in a 3D printer for performing multi-step processes including operations outside of the printer.

FIGS. 10A and 10B are schematic user interface view representations of a three dimensional printing system using a continuous core reinforced filament, in which FIG. 10A is one step of an exemplary workflow of the process of FIG. 7, and FIG. 10B is a subsequent or precedent step of the exemplary workflow of the process of FIG. 7.

FIGS. 11A and 11B are schematic side view representations of a three dimensional printing system using a continuous core reinforced filament, in which FIG. 11A is a schematic view of a continuous core reinforced filament-extrusion printer, and FIG. 11B is a schematic view of a continuous core reinforced filament together stereolithography (SLA) or selective laser sintering (SLS) printer.

DETAILED DESCRIPTION

Figure 2A:
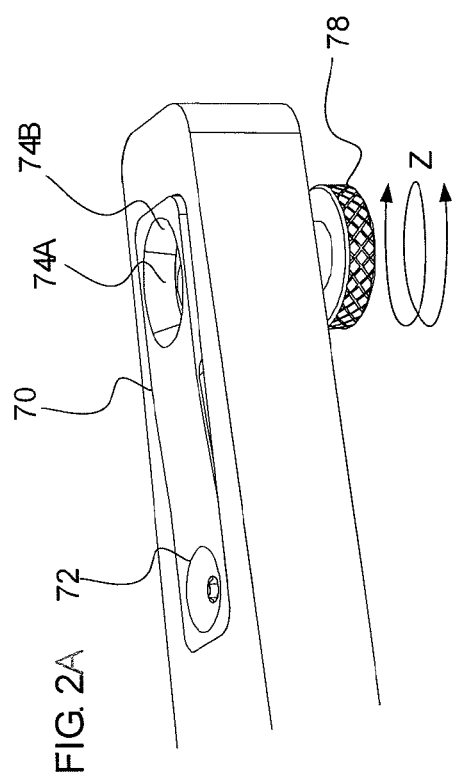

The invention, embodiments, structures, and methods disclosed herein eliminates interim processes to re-level a build platform by providing a mechanical means to ensure, e.g., sufficient repeatability in the location of the build platform. One embodiment of the solution includes a kinematic coupling between the build platform and the movable (usually Z direction) stage that holds said platform.

"Kinematic coupling" is a term of art in mechanical design, inclusive of various forms including the quasi-kinematic coupling. Accordingly, "kinematic coupling", as used herein, is inclusive of ideally designed kinematic designs as well as quasi-kinematic couplings and other non-ideal kinematic couplings. Slocum et al. described that a three ball, three V-groove coupling was too constrained to permit Z-direction adjustments to make facing planes parallel, and provided a solution in U.S. Pat. No. 5,678,994 (herein incorporated by reference in its entirety) by combining the kinematic coupling with a "flexure", another term of art machine element of various forms. Culpepper and Slocum described a quasi-kinematic coupling for bearing heavier loads in U.S. Pat. No. 6,193,430 (herein incorporated by reference in its entirety) and declaring the technique to be not achievable "in flexural kinematic couplings".

In some preferred embodiments, the kinematic coupling of the print platform has 3 semi-spherical ball protrusions, while the machine stage has three, two-point locating features, providing for no more and no less than six points, areas, or lines of contact.

As is well known in the art, idealized design of kinematic couplings relies on several rules and heuristics that preserve kinematic integrity. Idealized forms rely generally upon contact of surfaces in a manner that creates high Hertzian contact stress. As discussed herein, following all design heuristics to achieve peak repeatability may not necessarily be compatible with packaging of the features within a compact, desktop design; with ergonomics or user experience of the design; or with other engineering constraints such as load capability, stiffness, or cost. The quasi-kinematic coupling is one example of a kinematic coupling that is more constrained than the ideal point contact design, but bears higher loads.

As discussed herein, further aspect of the invention, embodiments, structures and methods is the enabling of one or more operations external to the machine through the locating features of the kinematic coupling. For example, a part can be 3D printed until a given level of completion, at which time the print could be paused, allowing the build platform to be removed, and operated on, prior to returning back to the machine. For example, a box could be printed, then removed for the installation of a circuit board, after which point it could return to the machine, with precise repeatability and alignment, to receive additional printed layers. In this manner, the 3D printer role is expanded beyond simply making prototype parts, and is instead turned into an assembly machine (also known as over-molding).

However, the kinematic coupling need not have repeatability in locating the build platform in any of X, Y, or Z directions in great excess of the precision or repeatability of the printing process itself, so sub-micron repeatability may be sacrificed in favor of packaging, scaling, load capability, stiffness, cost, or ergonomics.

As clearly shown in FIG. 1A, a single groove assembly of a kinematic coupling pair 7A may be formed as a single piece, unitary assembly with a flexure 70, a mounting point 72, a kinematic coupling groove 74, and a magnetic preloading assembly 76. Component pieces of the groove assembly 7A.1 are labeled in FIGS. 1-3.

As clearly shown in FIG. 1A, the kinematic coupling groove shape is not necessarily a straight V-groove of 45 or 60 degrees inclination, but is instead may be substantially circular, oval, rounded, oblong, elliptical, or surface of revolution (all herein "elliptic") depression. It may be a quasi-kinematic coupling groove that is a surface of revolution, such as a conic surface of revolution, and a completion portion 74B of the groove may be of a different radius, concave, convex, or cut away. A quasi-kinematic coupling includes of convex solids of revolution (3) mating with a corresponding set of three concave recesses of revolution. The solids and recesses may be on either side of the mating parts. Contact is in six arcs of contact, not points of contact. The contact surfaces 74A may be closer to one another than the diameter of revolution. For the purposes of the kinematic coupling, only a small point, area, line or arc along the longitudinal side contact surface 74A need function as contact surface or V-groove, and the remaining walls of the completion portion 74B may serve other purposes, including packaging and aesthetic. In this case, the remaining walls 74B are formed as an elliptic depression, of which the walls 74B may be a slanted surface (e.g., 45 degrees and straight) revolved (e.g., revolved at 45 degrees or 60 degrees or the chosen angle), or varied (e.g., varying from 45 degrees at the longitudinal sides to deeper and/or shallower angles), or other wall configuration (partial toroid, revolution of a curve, etc.). In this case, a short span along the longitudinal sides serves as the contact surface of the kinematic coupling, and the completion portion 74B of the elliptic depression are formed as blind guide surfaces to enable an end user to position the printing bed 80 to click into the receiving groove 74. For example, a user feeling with his or her fingers, or guiding the entire platform 80 to without line of sight to the receiving grooves 74, will readily locate the center of the grooves 74, which would not be the case for a long and straight V-groove (where the location along the V-groove may be uncertain).

As clearly shown in FIGS. 1A-1C and as would be readily understood by one of ordinary skill in the art, curved walls curved (as revolved or conic) increases Hertzian contact area and the load-bearing ability of the kinematic coupling (e.g., versus compression or pressure on the workpiece during operations). As the contact area increases, ideal six-point localization of the kinematic coupling is theoretically reduced, but for the purposes of three-dimensional printing at, e.g., 0.03 mm resolution or higher, where only a first layer and the first layers following pause-and-replace operations are affected by such inaccuracy, the reduction in accuracy is may be worthwhile.

As shown in FIG. 1C, an exemplary surface for contact surface 74A is a surface of rotation or revolution at an angle 74A.a of 60 degrees and offset radius 74A.r of approximately 8 mm, e.g., with an offset radius 74B.r of the guide surface 74B being approximately 3 mm. An exemplary thickness 70.t of each of the flexure leaves may be approximately 0.25 mm.

As clearly shown in FIGS. 1A-1C, the flexure 70 is a substantially four-bar linkage flexure, in which the links 70A, 70B are each thin leafs (e.g., less than ⅓ to ⅕ mm thick in the Z direction) extending in the X-Y plane, and form the "input" and "output" links 70A, 70B of the four-bar linkage, where the mounting point is the "grounded" link and the kinematic coupling is the "coupling" link. As is well known in the art, for small angle displacements of the coupling link (at the kinematic coupling end), the four-bar linkage will control the motion of the moving platform to be substantially rectilinear in the Z direction over the expected range of motion of each coupling end assembly 7A.1, 7A.2 or 7A.3 (see FIG. 3A).

Figures 3A, 3B:
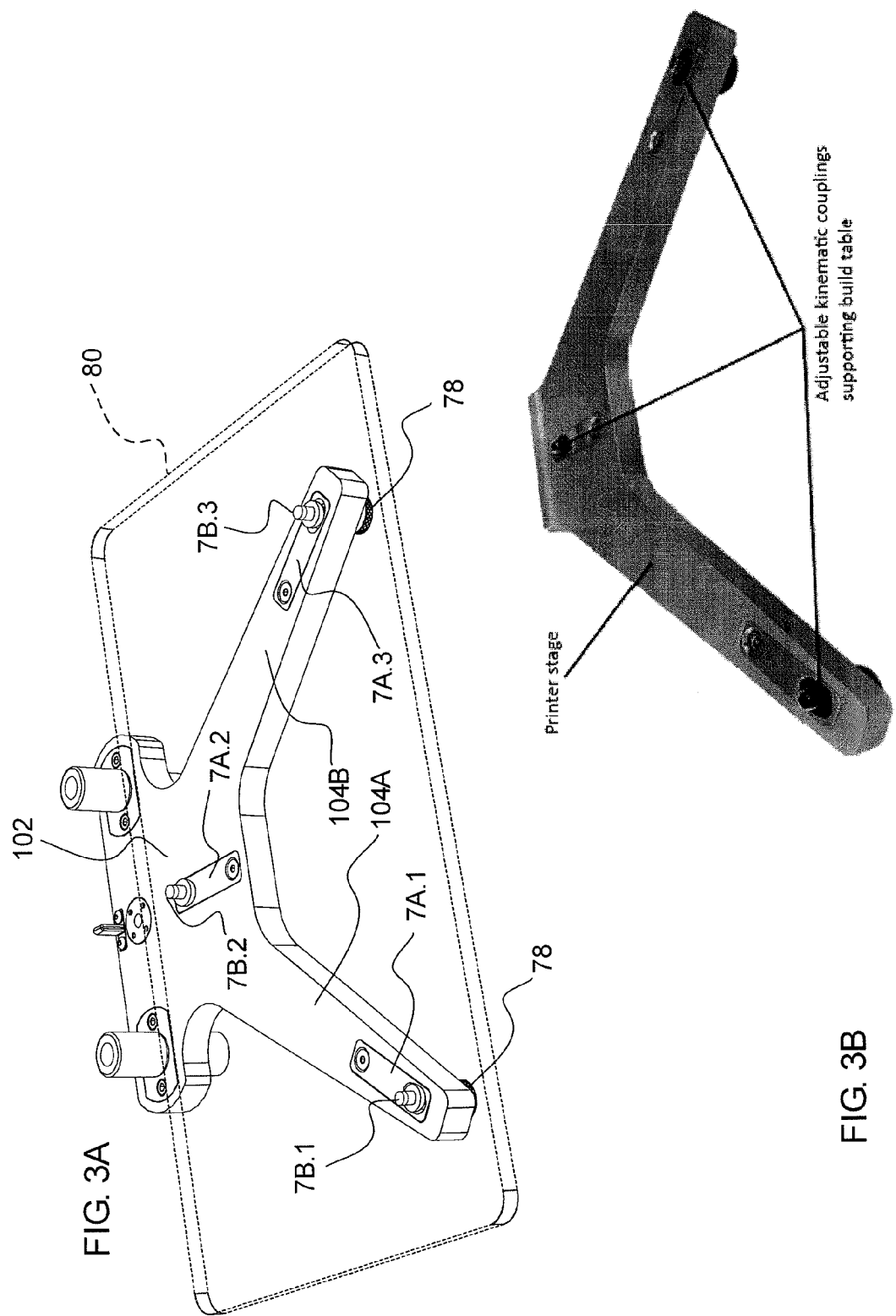

As shown in FIG. 3A, the printer stage 102 and build platform 80, in order to avoid overconstraint, should have no more than the six points, areas, or lines of contact of the kinematic coupling. Accordingly, the stage 102 need supports only the three coupling ends 7A.1, 7A.2, 7A.3 via the mounting points 72 over the length of the respective flexures 70. The coupling ends 7A.1, 7A.2, 7A.3 form a coupling triangle CT (see FIG. 4A), the coupling centroid CTC at the intersection of the angle bisectors CTAB being relevant for orienting the grooves and/or contact surfaces 74A. The stage 102 should support the remote coupling ends 7A.1, 7A.2, 7A.3 with as few and as short cantilever arms as is practicable.

Figure 2B:
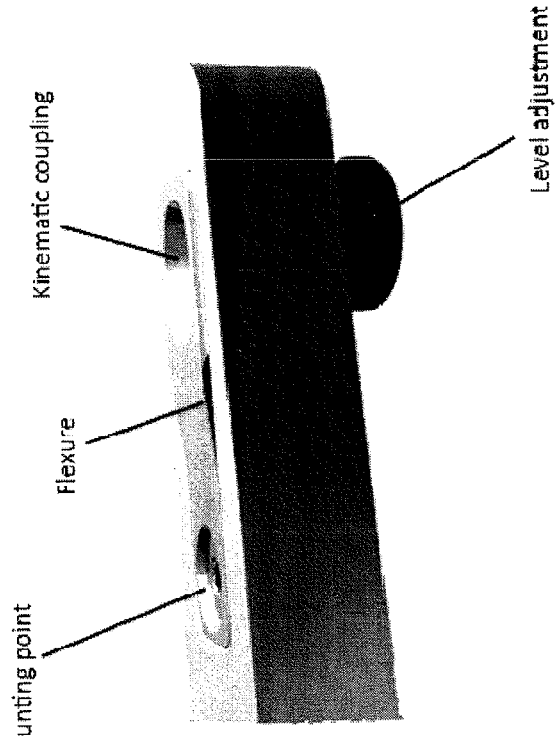
Figure 3C:
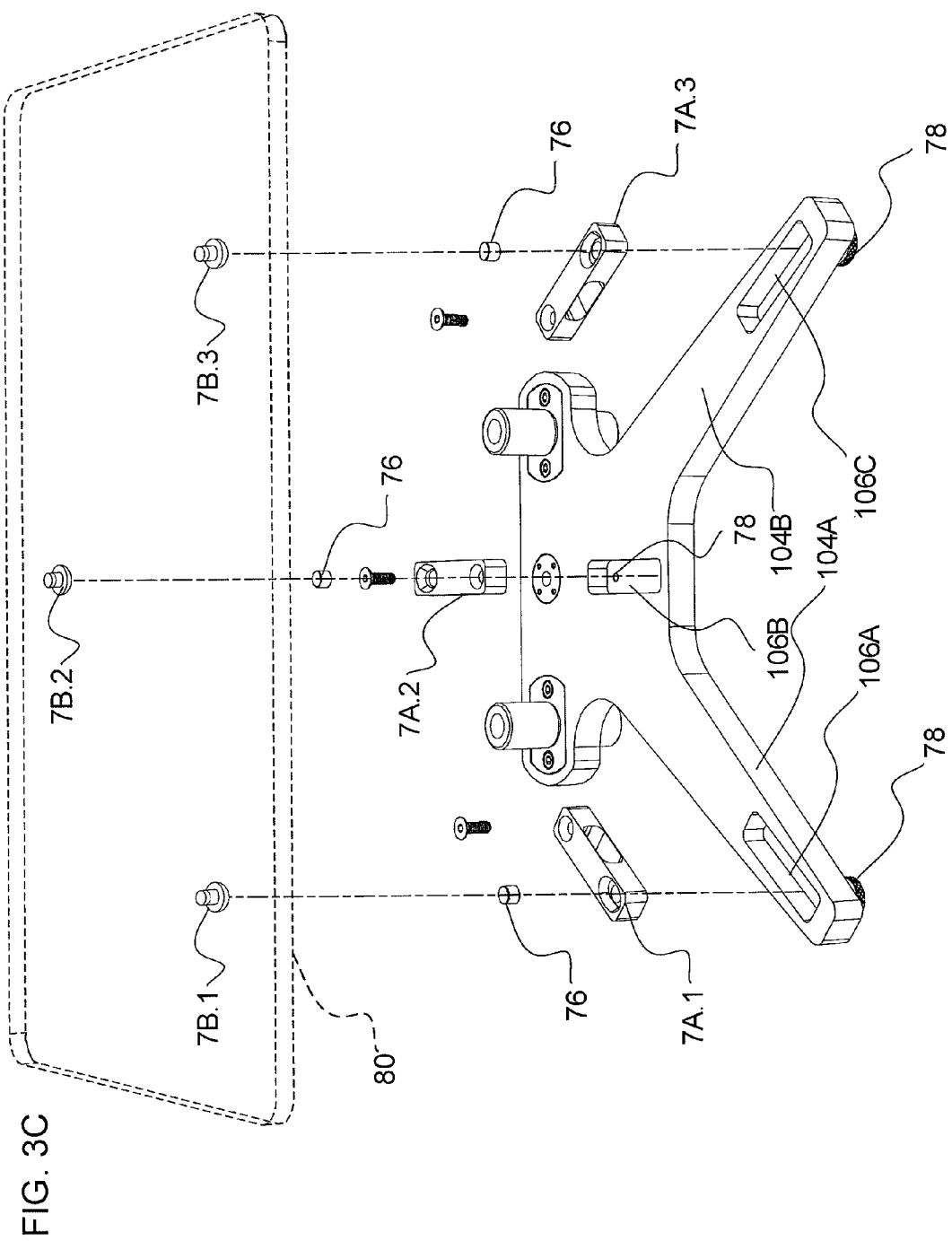

In the embodiment, structure, and/or method discussed herein and shown in FIGS. 1-3, the stage 102 is arranged to have two cantilever arms 104A, 104B, each supporting a coupling end 7A.1, 7A.3, with the remaining coupling end 7A.2 positioned proximate the drive for the movable stage 102. For a symmetric platform 80 and a non-equilateral coupling triangle 7C, the platform 80 may only be mounted one way; one coupling end 7A.1, 7A.3 may be located with each hand; the widest possible coupling triangle is established; and the coupling centroid is substantially coincident with the platform centroid for stability. Alternatively, the coupling triangle 7C may be arranged with two coupling ends 7A.1, 7A.3 nearest the drive for the coupling stage, or even with two coupling ends 7A.1, 7A.3 arranged along the left side of the platform 80 with the remaining coupling end arranged along the right side of the platform 80.

The 7A.1, 7A.2, 7A.3 coupling end location and orientation affects the rotational stiffness and stability. Locating the coupling ends with the largest or widest possible coupling triangle will impart higher torsional stiffness about the Z axis. Stability and overall stiffness is increased if groove directions are oriented to position normals to the planes containing the contact forces bisecting the angles of the coupling triangle. Changing orientations or groove directions may allow higher stiffness in a certain direction with some reduction in overall stability. Quasi-kinematic couplings may provide resistance along the groove direction due to the groove curvature, as well as stiffness in the normal to the angle bisector direction.

In the embodiment, structure, and/or method shown in FIGS. 1-3, as shown in FIG. 4A, the six points, areas, or lines of contact of the kinematic coupling are arranged other than with the contacting surfaces of the coupling ends 7A.1, 7A.2, 7A.3 parallel to the coupling triangle 7D angle bisectors CTAB, e.g., with normals to the point of contact perpendicular to the bisectors CTAB. There may be a loss in overall stiffness from the ideal alignment, but the orientation shown—substantially aligned with the supporting cantilevers 104A, 104B—provides sufficient constraint in the directions D1 of the normals to the contacting surfaces 74A and permits the supporting cantilevers to be thinner—less than three times the width of the coupling ends 7A.1, 7A.2, 7A.3 for weight, material cost, finishing cost, ergonomic, heat cooling and aesthetic benefit.

In addition, by arranging the combined coupling grooves 74, flexures 70 and mounting points 72 of the coupling ends 7A.1, 7A.2, 7A.3 to line up along the cantilever supports 104A, 104B substantially along the sides of the coupling triangle 7C, the cantilever supports 104A, 104B may remain thin, and any parasitic motion caused by exceeding small angles in the four-bar linkage of the one-sided flexure 70 is directed along the coupling triangle 7C sides or toward the coupling centroid 7D, e.g., in direction(s) that are evenly balanced and/or will preserve the two-point contact of each of the coupling grooves. It should be noted that potential parasitic motions caused by the use of the one-sided flexures 70 are themselves constrained by placing the coupling end 7A.1, 7A.2, 7A.3 in a slip-fit receptacle 106A, 106B, 106C following the Z-direction perimeter of the coupling ends 7A.1, 7A.2, 7A.3 to permit motion substantially only in the Z-direction. The kinematic coupling grooves are moved in the Z-direction by respective adjustment screws 78, which only touch the bottom of the coupling ends 7A.1, 7A.2, 7A.3 and do not add indirect constraint.

While the figures herein show three adjustment screws 78, one for each coupling end 7A.1, 7A.2, 7A.3, only two screws may be used to level the printing bed 80. In addition, the Z-direction actuation may be alternatively achieved by, e.g., motorized screws or linear actuators of sufficient resolution driven by a controller 20, for example in response to leveling measurements taken by a range sensor or leveling probe, e.g., mounted on a print head 18. Each adjustment screw 78 may include a tactile and/or auditory clicking mechanism that corresponds to incremental or digital amounts of Z-movement, e.g., 0.01 mm per click, should leveling measurements taken by a range sensor or leveling probe permit the controller 20 to communicate recommended leveling Z adjustment in terms of turns of the adjustment screws. A range sensor or leveling probe may also be used to establish a collision avoidance zone above an inserted circuit board or other part, or injected plastic used to affix such a part.

Figure 4B:
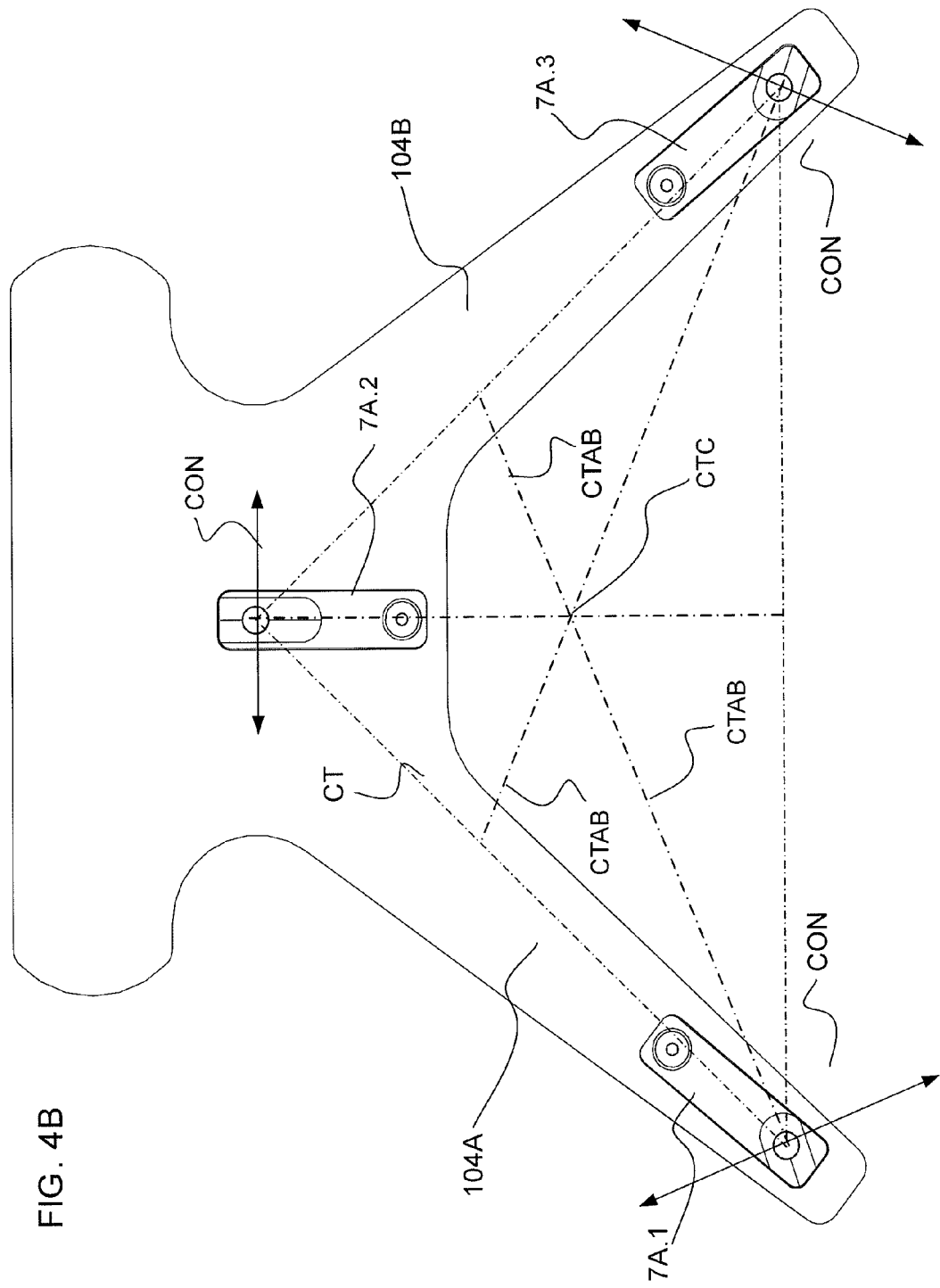
Figure 4C:
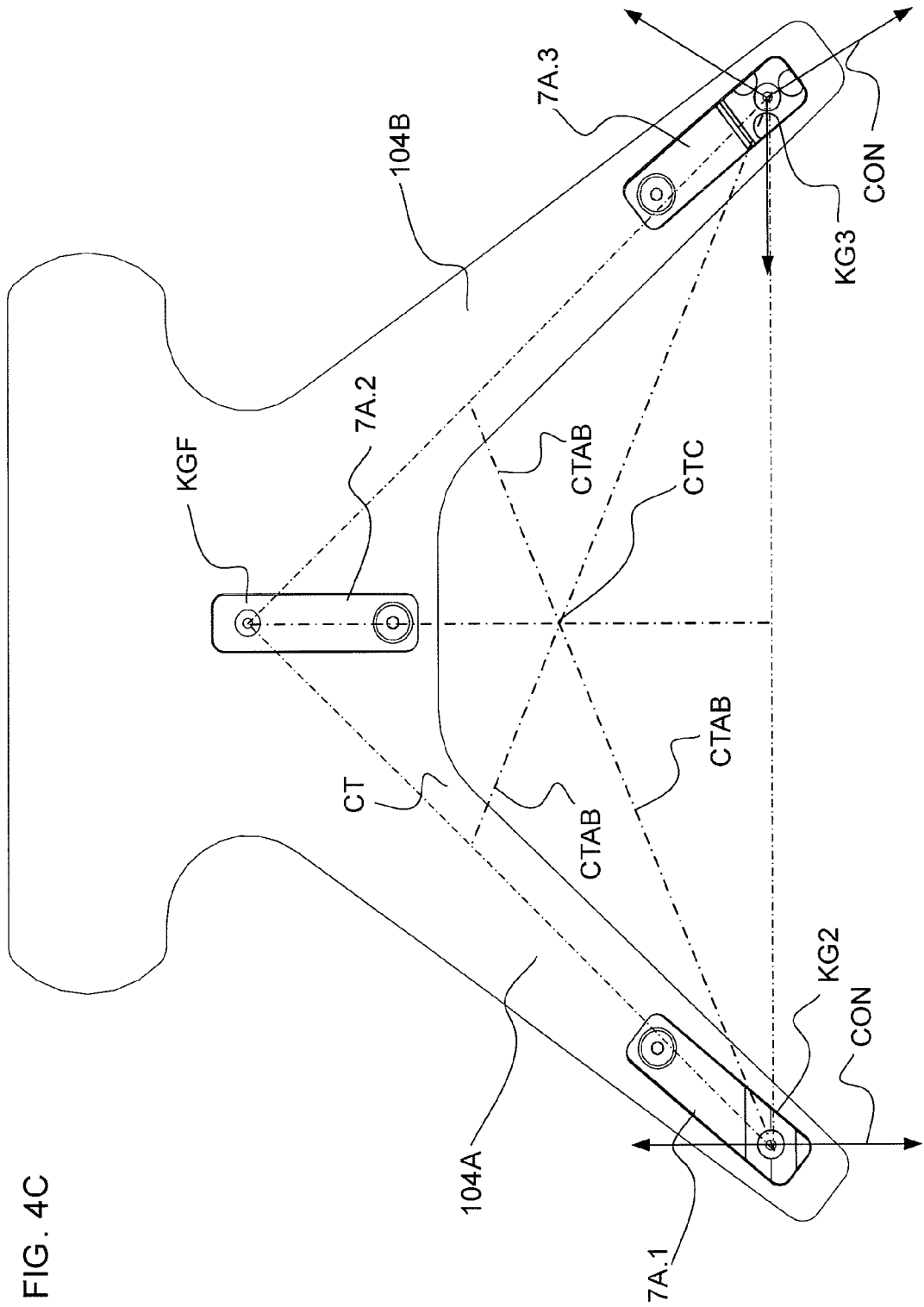
Figure 5A:
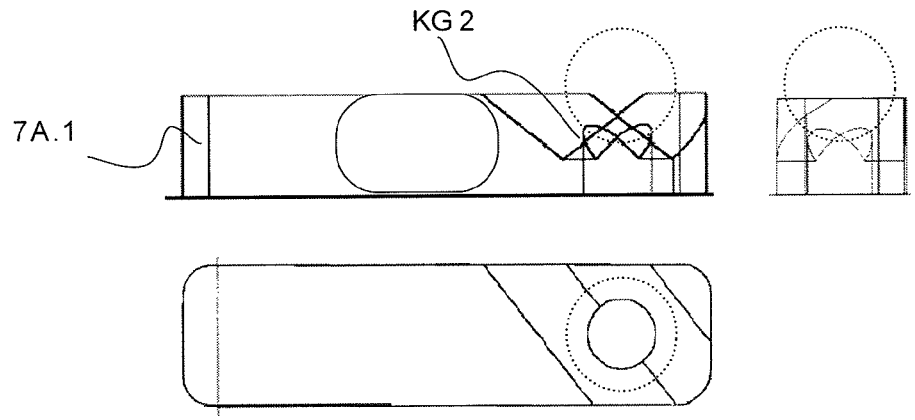
FIGS. 5A through 5C are orthogonal views of the three members of flat member, straight groove member, and three surface member kinematic coupling set of FIG. 4C.
Figure 5B:
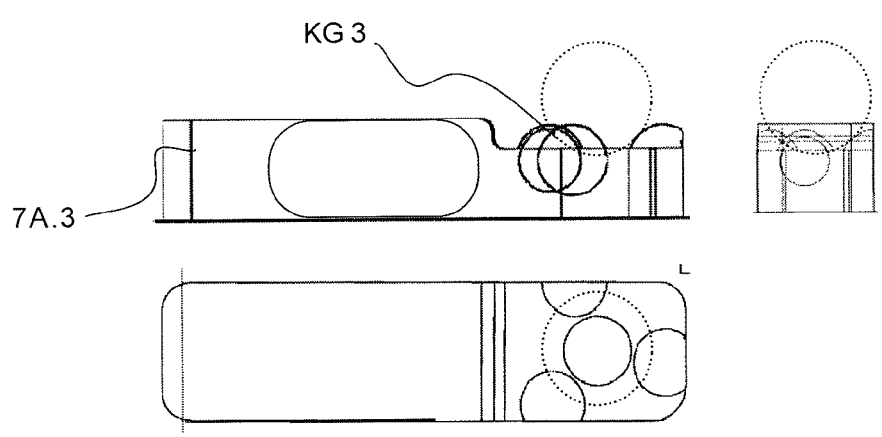
Figure 5C:
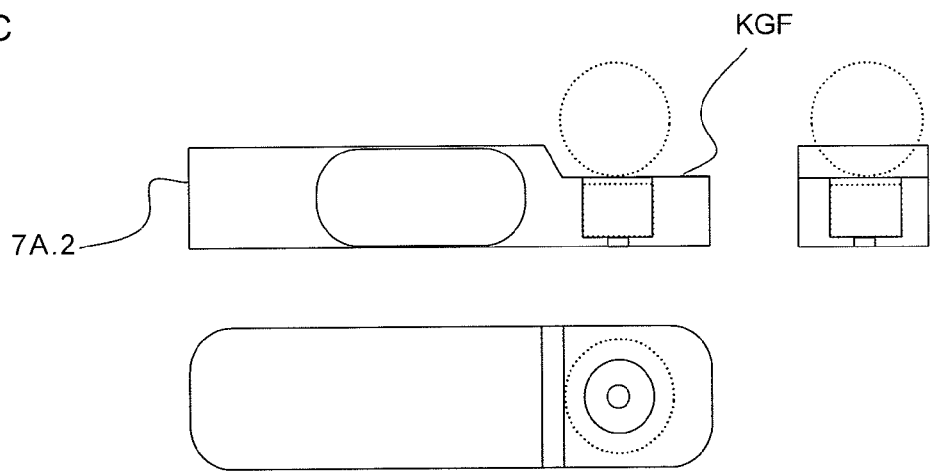

As shown in FIG. 4B, the coupling grooves may be arranged as V-grooves substantially or exactly aligned with the bisectors of the coupling triangle 7D, so that the normals to the contact surfaces 74A are perpendicular to the bisectors and provide the best overall stiffness and stability. Further alternatively, as shown in FIG. 4C, the grooves may be arranged as a first coupling end that is a flat (see FIG. 5C), a second coupling end that is a V-groove (or two-sided groove, see FIG. 5A) and a third coupling end that is a three-sided receiver (in this case, shown as three balls, see FIG. 5B, but alternatively a trihedral receiver, a cone, or a four-sided receiver). In each case, the receivers may be positioned on the upper build plate 80 and the semi-spheres, rounded-off, or rounded protrusions arranged instead on the lower coupling ends with adjusting flexures. As described herein, the contact between a protrusion 7A to a receiver 7B may be curve to flat, convex curve to concave curve, convex curve to convex curve.

Figure 6:
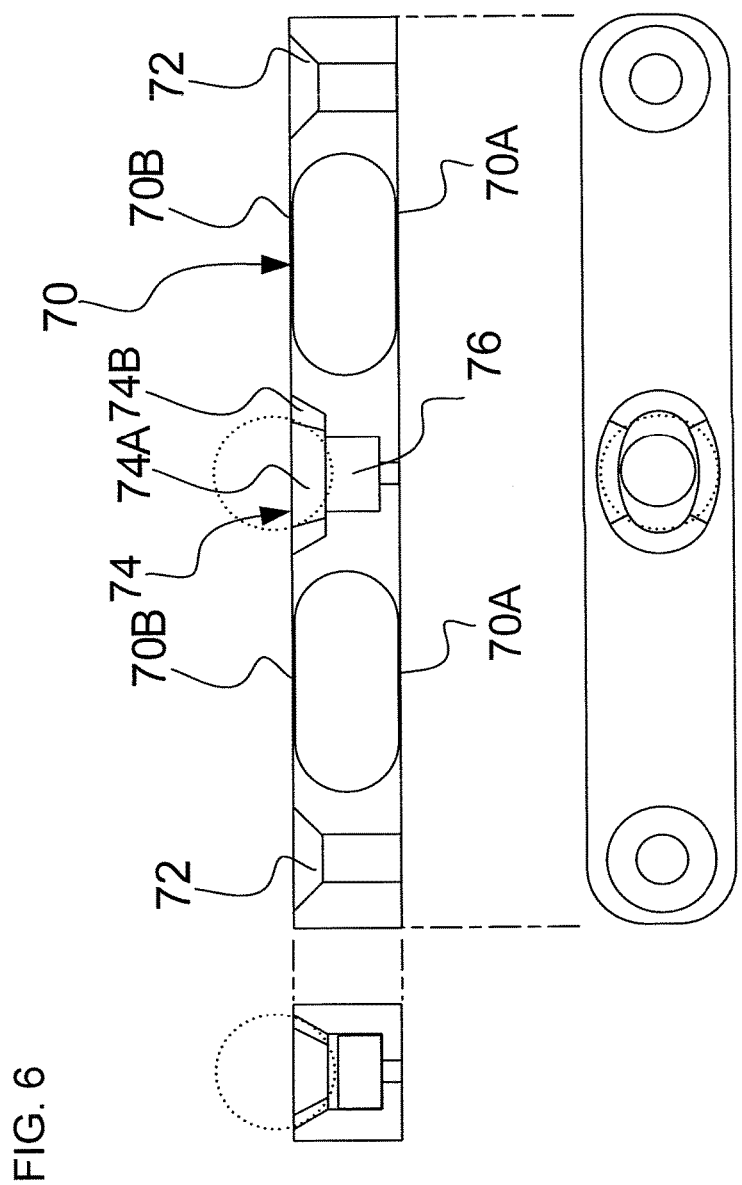
FIG. 6 is an orthogonal view set of a symmetric curved groove kinematic coupling flexure member for use at the end of a supporting arms of a movable stage of a 3D printer in the manner of FIG. 4A.

FIG. 6 shows the kinematic coupling groove and flexure assembly of FIG. 1C arranged as a symmetrical part in orthogonal views. Like elements to FIG. 1C are similarly numbered. The symmetrical part does not have any parasitic motion when the flexures are displaced beyond small angles, but must be supported in a way to permit the mounting points to move slightly in the Z direction. This element also takes up considerably more room than the one-sided element of FIG. 1C.

A kinematic or quasi-kinematic coupling may be configured with some amount of preload, provided by, e.g., a force pushing the protrusions directly into the grooves, such as directly in the Z direction. Ideally, in order to avoid adding a constraint or otherwise overconstraining or unbalancing the system, the preload should not add any constraints in any direction, and especially not in the X and Y directions. As disclosed herein, two preloads are provided. The first preload is provided by the weight of the platform, which is in the Z direction and not a constraint in any direction, and the second is a magnetic preload provided by using ferrous or magnetized protrusions and a rare earth magnet 76 positioned at the bottom of each groove, very close (e.g., 0.1-1 mm, ideally less than 0.5 mm) but not contacting the protrusion, again in the Z direction only and not a constraint in any direction. The forces of the two preloads are in the same direction. The magnetic preload is a high gradient, short range (going from negligible force to 1-3 lb. of force in 5 mm or less) force that pulls the protrusions into proper contact and also gives tactile and auditory feedback by emphasizing the contact impact as a click.

As shown in FIG. 7, the kinematic coupling, optionally with the flexure and adjustment, provides an effective method of performing multi-step operations on an article with a 3D printer, particularly in the case of operations that are performed by removing the build platform from the kinematic coupling. Prior to FIG. 7, bed leveling may be performed by adjusting one, two, or three Z-heights of the kinetic coupling, manually or automatically, as previously described. However, because the multistep operations are well facilitated if the bed leveling is already satisfactory, this is considered an optional step in the course of the steps in FIG. 7.

As shown in FIG. 7, in step S02, the build platform 80 is received upon the movable stage 102. In one example discussed herein, the movable stage 102 moves in the vertical or Z direction, but it may move in additional X or Y directions, or even one or more rotational directions, depending upon the configuration of the printer. The printer may include a sensor for detecting the receipt of the build platform 80.

Subsequently, in step S04 the build platform 80 is located to the movable stage with a six point contact alignment between three curved protrusions and the corresponding six locating features. In one example discussed herein, the six locating features may be arranged in three sets of two features, which optionally have adjacent guide features for blind guidance of each curved protrusion into corresponding locating features. The six point location or contact alignment is the same location as was or would have been previously established in bed leveling. If there has been a previous cycle of removing the build platform 80 for operations as in step S14, S16, the build platform is returned to the same six point alignment as before the offline operations.

As noted, the engagement between the protrusions 7B and the locating features 7A constrains movement of at least two of the three curved protrusions using at least two individual flexures 70, each constructed to flex two leaves 70A, 70B in parallel to constrain movement of a corresponding one of the three curved protrusions 7B to move substantially only in the Z height. The engaged grooves 7A and protrusions 7B move together, so the flexure 70 member may carry either one. The flexure member, particularly the movable groove 7A or protrusion 7B end, may be further constrained to slide in the Z direction in a form-following receptacle 106 having walls in the X or Y direction (especially constrained in direction(s) of potential parasitic motion).

In step S06, the build platform 80 is held on the movable stage 102 to the kinematic coupling by, e.g., gravity, magnetic force, and/or a clamp. As discussed, the holding force is the preload force, in the Z direction only, which relocates the coupling to the baseline position having settled into the preload level of Hertzian contact deformation. Ideally, further constraint is not placed on the kinematic coupling by the holding force, e.g. either or both of gravity and magnetic force are suitable. While the process of FIG. 7 is noted to be applicable to 3D printing, which tends to apply only low forces in the X, Y, or Z direction (potentially higher in the Z direction for the case of fiber compaction), the process is applicable to other desktop processes controlled for Cartesian or other coordinate motion in layered toolpaths or 3D toolpaths, such as conductive ink or paste printing, machining or milling, or painting or spraying. In the case of machining or milling, clamping the build platform 80 to the kinematic coupling in a manner which does not introduce new X-Y constraint is appropriate, and/or using a quasi-kinematic coupling and/or convex curve-to-concave curve features in the coupling (e.g., canoe sphere or ball in arch). Directions discussed herein as X, Y, and Z may be interchanged if clamping is used for the Z direction (i.e., the use of a Z direction here assumes the benefit of gravity in the Z direction for printing or handling operations, but for printing or handling operations which may be carried out without gravity or opposite or transverse to gravity, all of these directions may be interchanged, so long as Cartesian functionality is preserved.

In step S08, the build platform 80 then receives printed layers of the article or part 14, 1600, as layers of the article 14, 1600 are deposited, cured, melted, or otherwise accumulated in a 3D printing process (e.g., FDM, FFF, SLS, SLA, or the like). In an FDM process or a continuous fiber process, the layers are deposited one layer at a time by a print head 18, 20, 1616/1618 (e.g., extrusion or otherwise) moving in toolpaths within layers or shells. In an SLS process, the layers are cured within powder 1604 held by the build platform 80 (e.g., within a container, where the build platform is lowered and new powder applied) one layer at a time by a laser. In an SLA process, the layers are cured by a laser or image projector 1616/1618 one layer at a time within a photopolymer fluid 1604 tank held by the build platform (e.g., within a container, where the build platform 80 is incremented and uncured fluid made available for each layer). In other processes, e.g., inkjet processes, the layers are similarly deposited. Any number of layers may be deposited before the first instance of interruption for a new operation benefiting from removal of the build platform 80.

As discussed herein, a glue gun step for forming glue pegs or glue borders may be integrated in this routine as an alternative within to step S08 (shown as step S08A). For example, gluing or adhering a part would be carried out and the process continued with further layer depositions until the next pause. The remainder of the steps would be the same.

In step S10, the printer (e.g., the controller 20) checks whether the 3D printed layers of the article have reached a preset level of completion. The completion level may be detected by monitoring for a pause or other command in instructions and/or G-Code, monitoring for a surface in a model or mesh being stepped through in memory as the part is built, and/or monitoring an active sensor for a part or insert or build platform Z direction height.

In step S12, when the first (or any subsequent) preset level of completion is reached, the printer (e.g., the controller 20) pauses the printing of the layer. For example, the printer pauses depositing, curing, or fusing of 3D printing material, moving a printing head to a home or resting position. The printer (e.g., the controller 20) may, if not having an absolute encoding for printhead or other position, re-index the location of the printhead (by means of a limit switch, encoder, sync pulse, and/or hard stop) in any, two, or all of X, Y, Z directions. The printer (e.g., the controller 20) may then control actuators to move the print bed into a convenient position (e.g., down or up, or in X or Y directions) for unobstructed access; and/or move a printhead(s) to positions not impeding access to the print bed 80. A paused print job is shown, e.g., in FIG. 8A.

In step S14, the build platform 80 or print bed 80 may then be removed by hand or by mechanism. The build platform 80 is removed from the six point contact alignment for operations outside the movable stage 102. Such operations may include, as discussed herein, placing a circuit board, circuit element, electronic element, jumper, connector, wire or sensor within or upon the part; placing a mechanical hard stop, fixture, boss, threaded receiver, or other interface within or upon the part for overmolding or melt-in; printing circuits, traces, or leads with conductive ink or melted solder; machining or milling or drilling the part internally (within the outer contour) or externally (the outer contour); injecting, applying, spreading, or spraying softener, solvent, dye, paint, adhesive, filler, coating, potting compound, or foam. An insertion of a circuit board CB is shown, for example, in FIG. 8B.

In step S16, in many cases, the operations outside the movable stage 102 are carried out by hand or without a particular need for kinematic coupling, such that protrusions 7B of the build platform 80 may rest upon a table or fixture that does not include receiving kinematic coupling grooves 7A (or groove members 7A may rest upon a table or fixture without protrusions 7B). However, in some cases the operation outside the movable stage 102 may benefit from accurate, repeatable localizing, and an external operation stage 102.e may include a receiving compatible kinematic coupling arrangement (e.g., substantially identical grooves/protrusions 7B/7A to those in the movable stage 102, and/or ones that are merely compatible with the shape of the kinematic coupling parts on the build platform 80). In such a case, the external operation stage 102.e receives the build platform 80 with six point contact as well. The external operation stage 102.e may also be leveled using flexures or other constrained Z-direction adjustment, again at least two points. It should be noted that the once the movable stage 102 and the external operation stage are each calibrated (e.g., leveled), the build platform 80 can be moved any number of times back and forth between the stages 102, 102.e. Until one of the movable stage 102 or external operation stage 102.e are jarred or otherwise require re-leveling, the two kinematic couplings, between them sharing the rigid components (e.g., protrusions 7B) transported with the build platform 80, each are stable and repeatable.

The external operation device may also be able to use certain data from the 3D printer in order to localize operations. In particular, an X-Y origin for the part 14, 1600 adhered to the build platform 20, relative to a calibrated or re-indexed origin may be useful. Alternatively, or in addition, the build progress of the part 14, 1600, in the form of a partial or full mesh or meshes corresponding to the shape of the full part, partly printed part, and/or inserts, and/or slices representing the progress of the build, and/or data representing the level of completion, may form data made available from the 3D printer to the external operation device. The data package may be transmitted wirelessly, peer-to-peer, via a LAN or WAN or the internet, and/or via a mesh network, from the 3D printer the external operation device.

Following the external operations outside the movable stage 102, the build platform 80 is returned in step S02 (manually, automatically, or a combination of these) to the six point contact alignment. In step S04, the kinematic coupling receives the build platform 80 in precisely the same position as it was removed from. If an ideal kinematic coupling, the repeatability of X, Y, and Z position may be in micron or sub-micron levels; if a quasi-kinematic coupling or partial kinematic coupling, perhaps an order of magnitude less. In many cases, the resolution of printing in any direction is 5 to 10 times coarser than the repeatability of the kinematic coupling. The printhead 18, 10, 1616/1618 and/or movable stage 102 may be relocated to former positions at which the pause was initiated, e.g., after re-indexing, relative encoding, or absolute encoding to arrive at the former position.

As noted, the provision of a guiding surface 74B to a groove portion 74 of a kinematic coupling may provide tactile or auditory feedback of the build platform 80 being received in the kinematic coupling to the movable stage 102, and this is enhanced if the kinematic coupling is magnetically preloaded, having rare earth magnets (e.g., with a force gradient from negligible force (e.g., 0-0.2 lb. force) to 1-3 lb. of force within 5 mm or less) arranged from substantially 0.1 to 1 mm, ideally 0.5 mm or less from the facing surface of the coupling protrusions when in the preloaded position of the kinematic coupling. Each magnet 76 should be about ½ cm (e.g., ¼ -¾ cm) in diameter or less, and/or about ½ cubic cm or less (e.g., ¼-1 cubic cm) in volume.

At step S06, printing may then be resumed with the printing additional layers, without further adjusting the Z height of any of the three curved protrusions. The build platform has already been leveled.

Figure 8A:
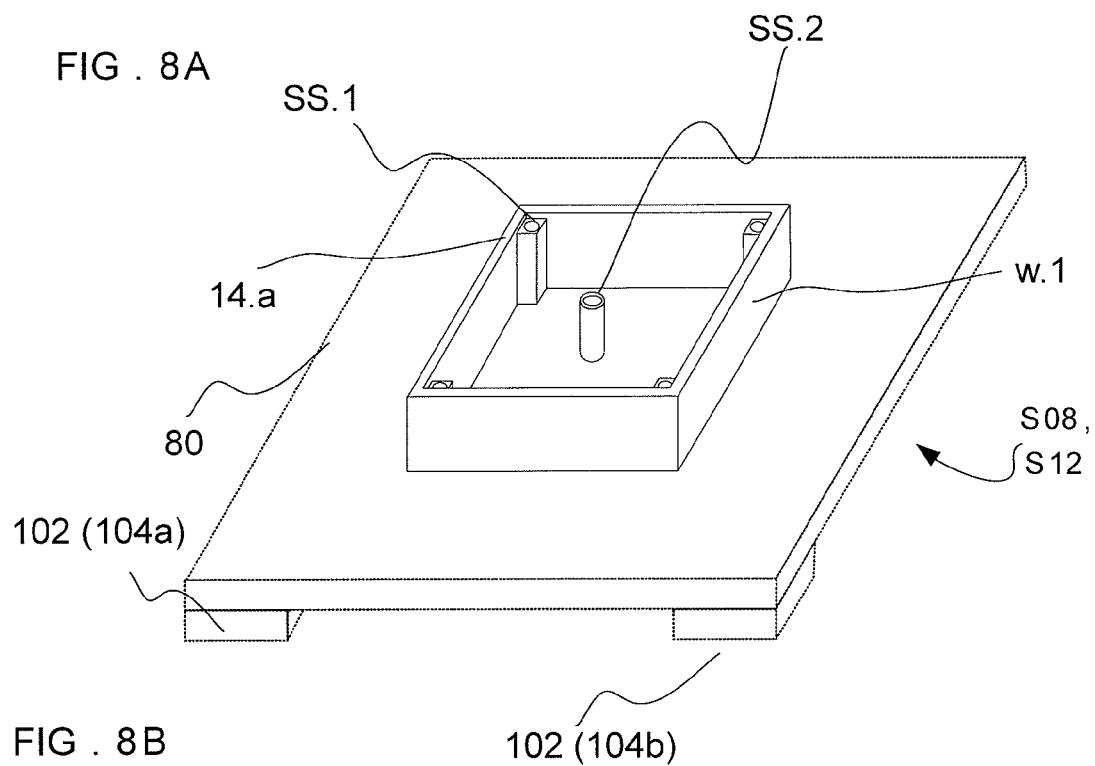
FIGS. 8A through 8D are schematic orthographic views of one exemplary workflow of the process of FIG. 7.
Figure 8B:
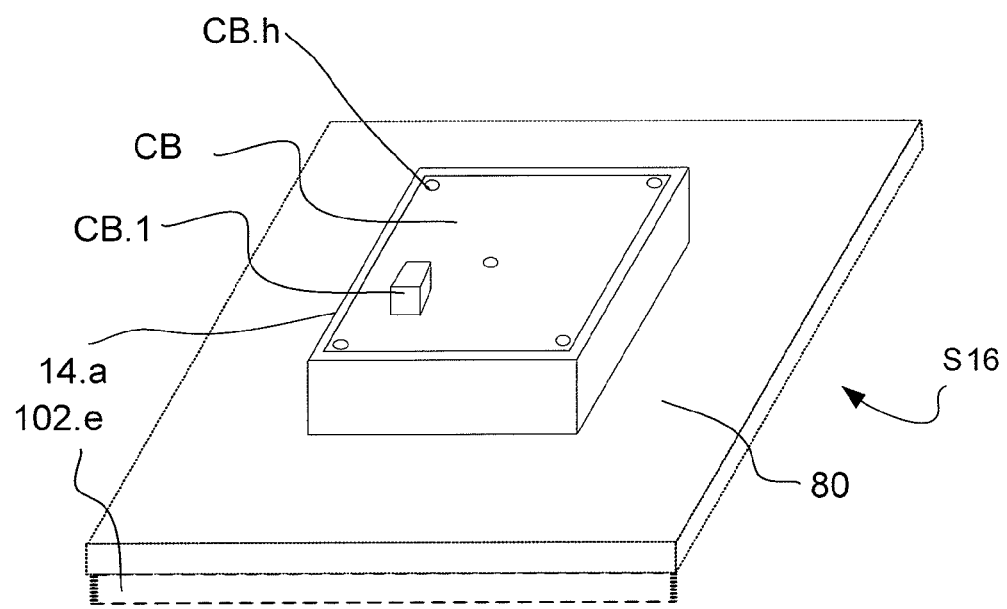
Figure 8C:
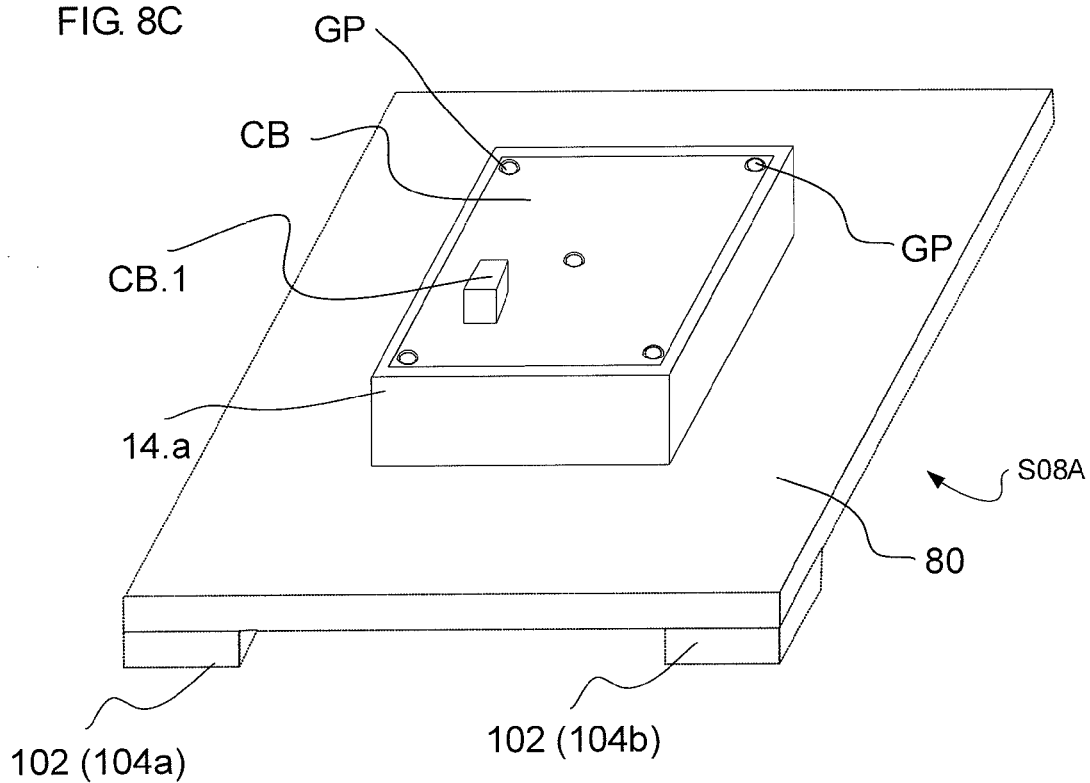
Figure 8D:
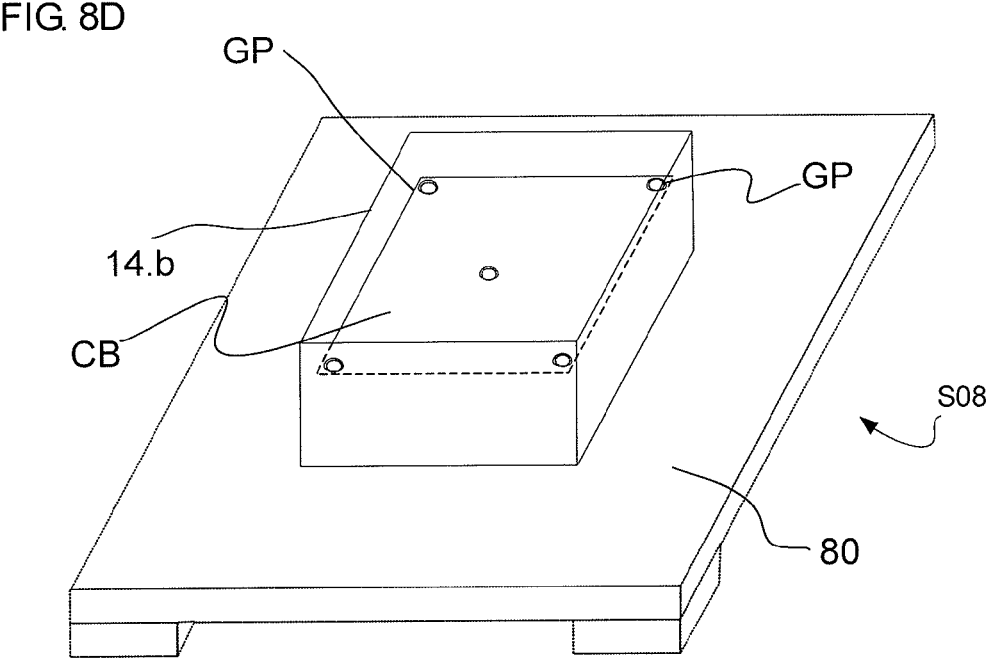
Figure 9:
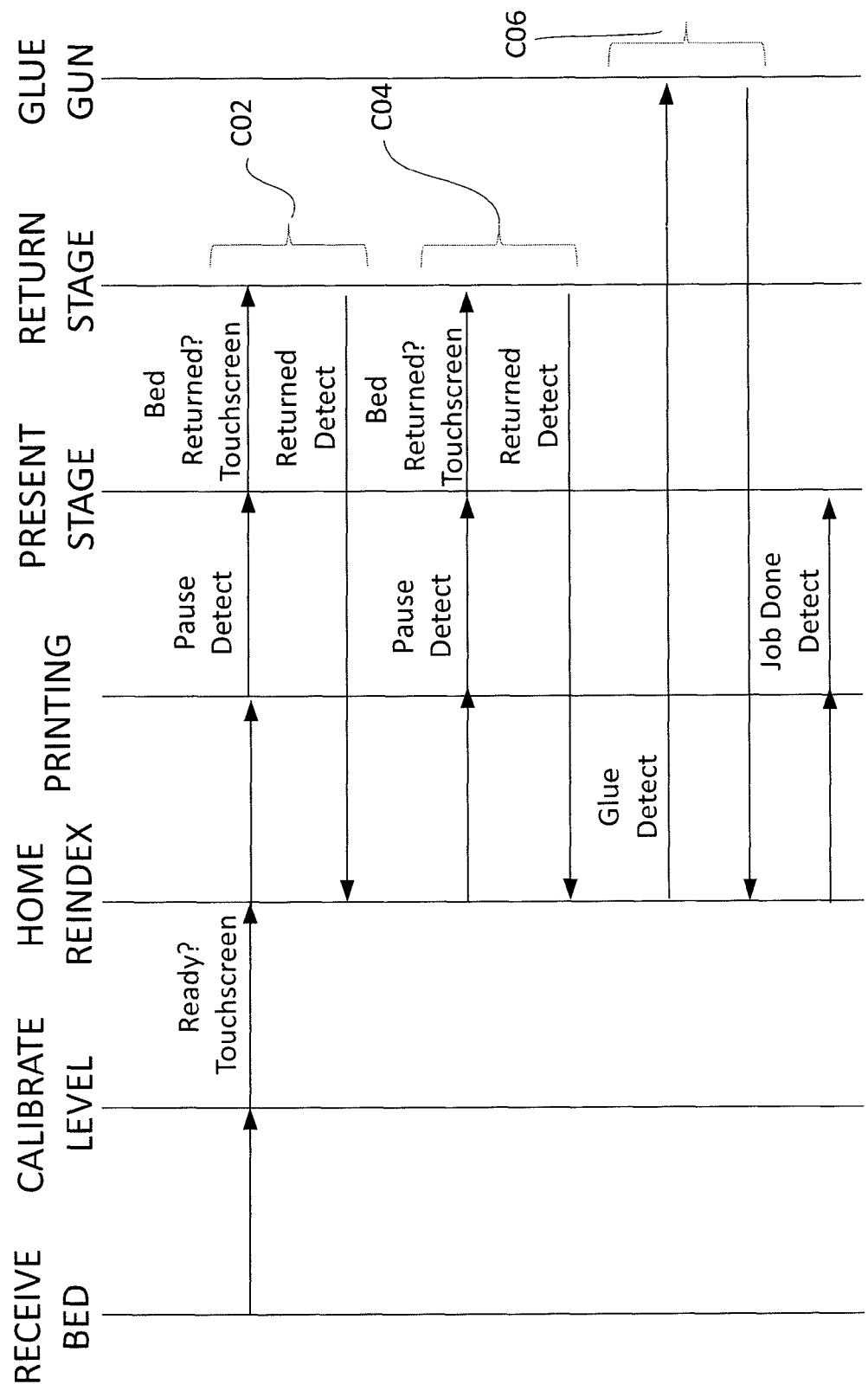
FIG. 9 is a schematic call diagram views of one exemplary workflow of the process of FIG. 7.

As discussed herein, a gluing or adhering step S08A, distinct from 3D printing of the part in that it applies material that is not part of the imported part model or STL (in pins, borders, welds, webs, or nets) may follow part insertions in particular, as shown in FIGS. 8C, 8D and 9 in particular. The material may be the same as the fill material, but is nonetheless not part of the part STL. Alternatively, the pins, welds, borders, webs, or nets may be part of the a multi-part assembly STL group, but not unitary with the part mesh, i.e., separate 3D shapes that are formed independently, albeit in place within the part mesh and formed part, in the 3D printing process.

Accordingly, before 3D printing is resumed, in certain printing modalities such as FDM, FFF, or SLA printing, inserted features may be tacked, glued, or pinned using either the existing printhead 18, 10, 1616/1618 or a supplemental printhead. For example, a circuit board CB placed in a receiving, supporting part 14 (as shown in FIG. 8A) may be welded in place, by depositing a fused column GP (as shown in FIGS. 8C and 8D) through a pin, screw, or mount hole CB.h in the circuit board CB, the fused column GP optionally including a cap formed by extruding material to flow in a disk shape, or depositing a disk shape at the top of the fused column GP. Fixing or adhering cap material may be extruded in place, while moving horizontally, or while moving upward slightly in the Z direction. A cylindrical or columnar hole, e.g., including internal ridges or steps to provide Z-direction constraint, may have been formed directly below the location of the fused column GP.

FIG. 9 shows, in call diagram form, one possible workflow for both non-gluing pauses and gluing pauses in combination. The steps and messages in FIG. 9 generally correspond to the flowchart of FIG. 7 and the schematic scenario shown in FIGS. 8A-8D. In the first component of messaging and operational steps C02 shown in FIG. 9, initially and optionally, the build platform 80 is calibrated or leveled as discussed herein, using the kinematic coupling, flexures, or manual or automatic steps. This step may already have been completed. These two steps may also be considered to be predecessor steps in FIG. 7, before step S02. The build platform or print bed 80 is then placed in on the receiving stage 102 as in steps S02-S06 of FIG. 7. Using a kinematic coupling between the moving stage 102 and the build platform 80, is preferred, but not required, as a build platform 80 may be leveled by other means and mechanisms with lesser but sufficient repeatability. The printer's controller 20 then checks for readiness, which may be via a connected sensor for detecting the receipt of the bed (e.g., Hall effect, limit switch, photointerruptor, camera, motion— any proximity or contact switch) or may be via a button or input, such as via touchscreen 128.

When the build platform 80 is located and preferably under preload, the location of different actuators, such as the X, Y, and/or Z actuators, may be calibrated, re-indexed, synced, or set to a home position (or may have been waiting in an indexed or calibrated position). The printer then initiates the printing of a part 14 as in step S08 of FIG. 7. As in step S10 of FIG. 7, when a pause is detected (e.g., by monitoring G-code, instruction code, other code, or the part itself), the printer stops and/or retracts actuators associated with printing (e.g., stopping X, Y, Z actuators, and/or stopping, turning off, or retracting material feed actuators; and/or stopping, standby, turning off, or homing lasers or projectors). The position of the part (i.e., X, Y, and Z) may be recorded in the memory of the controller 20 for the purpose of resuming printing. X and Y actuators may be homed here. The stage 102 may then be presented to an end user or process, e.g., by actuating a Z controller and actuator to move the Z stage to an accessible or lower/lowest position (and/or actuating one or both of X and Y actuators to move the stage 102 toward the user, if either such actuator applies to the movable stage 102). At this point, the part 14 may be upon the platen 80 upon the stage 102 as shown in FIG. 8A.

The printer may, optionally, detect the removal of the build platform or print bed 80 and/or its return via the sensor or input, as previously noted. External operations are carried out as describe with respect to step S16, e.g., or as shown in FIG. 8B (e.g., the placement of a circuit board. The circuit board CB shown in FIGS. 8A-8D could be a rigid strengthening panel; all of the steps applicable to the circuit board CB are also applicable to rigid strengthening members or fasteners such as nuts or threaded plates. When the bed is returned, the printer's controller 20 controls the X, Y, and/or Z actuators to return the movable stage 102 to return to the recorded former position (or a next position to print from), optionally via a trajectory that moves the X and Y actuators to the former position before moving the Z stage directly vertically to bring the build platform/platen 80 near to the print heads. The controller 20 may also optionally home, reindex, recalibrate, or resync before restoring the position of the platform 80.

The second component of messaging and operational steps C04 shown in FIG. 9, is the same as C02, other than the initial receipt and leveling of the bed. That is, steps in FIG. 7 from S02 through S16 are carried out for a second pause and operation outside the stage 102.

The third component of messaging and operational steps C06 shown in FIG. 9 reflects a gluing operation. As "glue detect", upon detecting a gluing marker in the instructional code or upon the part (e.g., via a sensor), and having determined or received the operative parameters, the printers controller 20 initiates the gluing steps, e.g., to apply glue in designated positions as discussed with respect to FIGS. 8C, 8D, 10A, and 10B. Operative parameters may include at least X, Y, and Z positions of glue to be applied, but potentially also dimensions, shape, height, amount of material or extrusion of a glue pin or fused column to insert, whether a cap is to be applied, what form of cap, whether a border is to be applied. "Glue gun" mode, in which the fill material printhead (e.g., printhead 18) or an accessory print head is applied or activated. In ordinary 3D printing, each layer includes only X and Y motions, and does not extrude or cure material while moving in the Z direction. While affixing, gluing, or welding in the glue gun mode, the printhead may extrude or overextrude or cure material while moving in the Z direction over the location to be glued (e.g., to fill a hole, create a cap, create a blob, weld a corner, or the like). It should be noted that "gluing" in this context may mean other non-printing operations that can be carried out by the origin 3D printer (e.g., spraying, milling, tacking, welding). A non-printing operation is one that does not build up 3D printing layers in a solid model volume as sliced from an origin model or STL.

As shown in FIG. 9, at the conclusion of the gluing step, the printer's controller 20 may return to previous printing steps, including (although not shown) subsequent 3D printing as shown in FIG. 8D, subsequent pauses and external operations, and the like. Upon detecting that the overall printing job is done, the printer's controller 20 may control X, Y, and/or Z actuators to present the stage 102 to the end user.

Figure 10A:
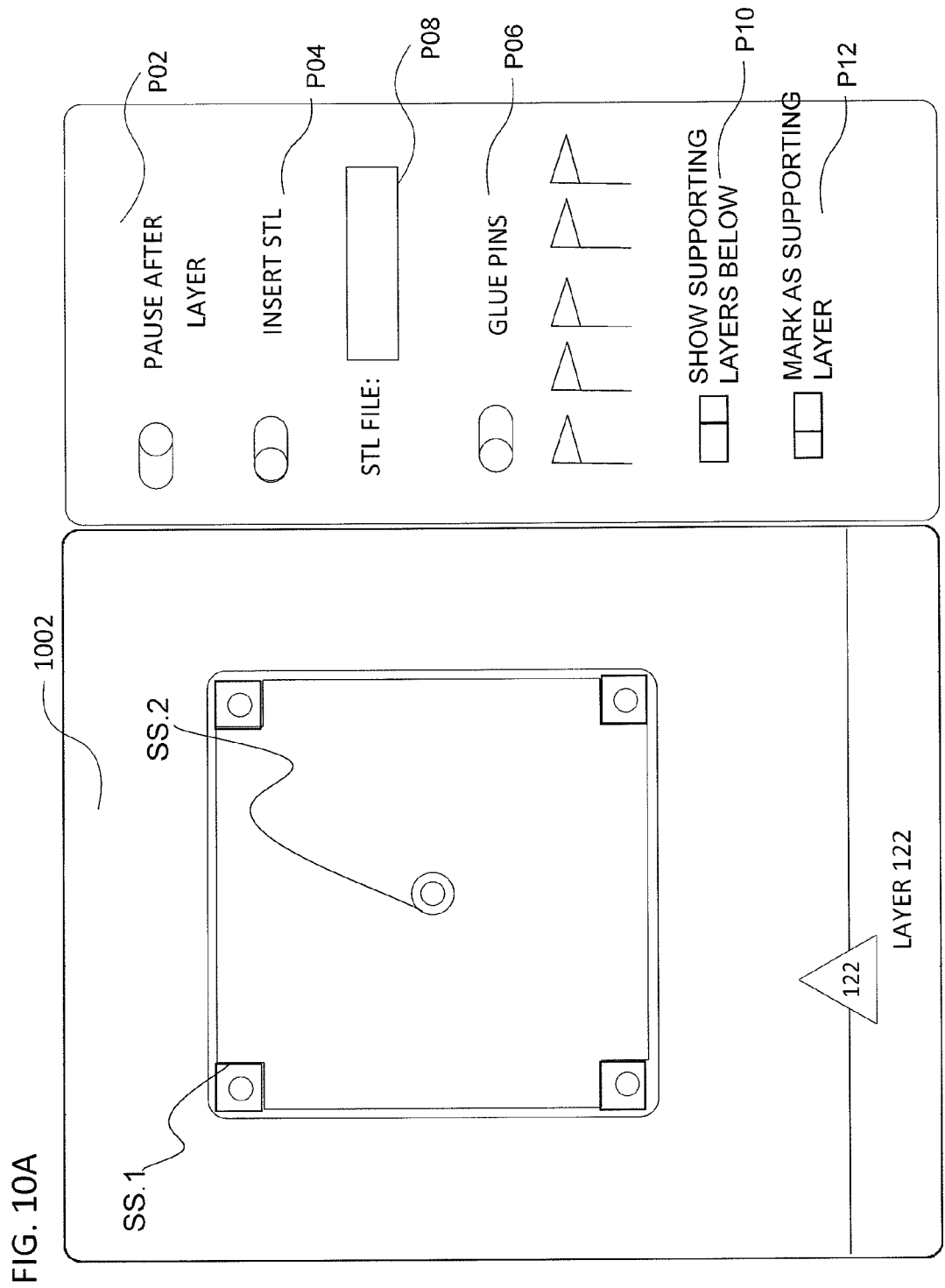
Figure 10B:
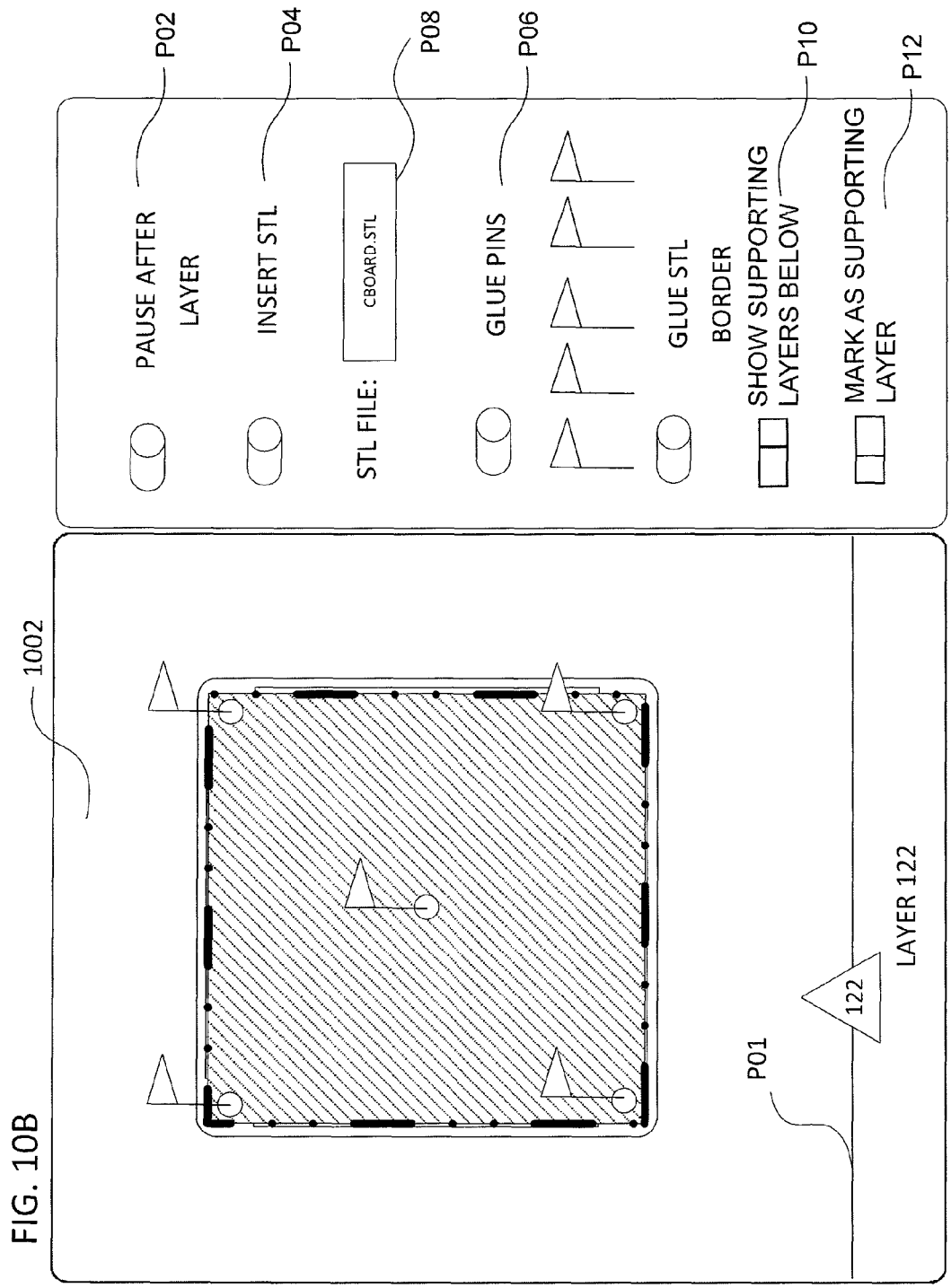

FIGS. 10A and 10B shows an exemplary on-screen part rendering and logic structure for some of the flow chart and work flow of FIGS. 7-9. A view panel 1002 includes an on-screen rendering of a geometry file retained in memory or other database. The geometry file rendered in the view panel 1002 may be shown in different views (e.g., isometric, perspective, orthogonal), and/or in different sections, and/or with or without layers, contours, regions or toolpaths rendered within. Each of FIGS. 10A and 10B depict "layer at a time" plan view with a layer number control slider P01. In each view, occluded toolpaths or surfaces may be hidden or shown, and rendered lines and surfaces may be rendered with selective color and transparency as set by the user. Contour, region, layer, fill, material, and other metadata corresponding to a characteristic may be rendered in outline and/or highlighted with selective color and transparency as set by the user.

A selection panel adjacent the view panel includes a set of user interface elements that correspond to command flags, arrays, and lists stored in memory or other database. As disclosed herein, whether or not particularly disclosed separately in discussion of data structures, each on-screen rendering corresponds to that data structure discussed herein necessary to render the view, and each view panel and selection panel user interface element corresponds to a respective flag, array, or list retained in a database in like form to those particularly detailed.

Exemplary global rules that control path planning for each layer that are available to the path planner, and also available to a display renderer for the view panel and a controls renderer for the selection panel, are shown in the view panel. Numbering for features rendered in the view panel may reference any of FIGS. 7-9. Several available choices are not depicted in FIG. 10A or 10B, although these would appear in an available view panel. For example, the user may select (and the path planner thereby execute) the thickness of and/or number of bonded ranks forming inner and/or outer walls or shells, the thickness and/or number of bonded layers for floors and/or roof dense or watertight fills; whether or not to use peelable and/or solid supports for printing overhangs; and/or a fill pattern (triangle, hex, square, cellular) for infill of inner areas for weight reduction. Generally, many more parameters may be set by presenting a configuration file (e.g., layer thickness and/or bonded row width; variable feedrate for curves, bends, or outer/inner walls; bridging (printing unsupported spans) lengths for neat plastic or fiber; or limitations for printing spurs (single walled sections).

FIG. 10A shows an exemplary display for layer rule operations on a view panel 1002, and is again generated by rendering to screen 2D definitions (optionally presented in 3D) of contours, subcontours, and toolpaths, with optional processing for occlusion and showing and hiding particular feature types. An alternative plan view per layer is shown in the view panel 1002, set to the 122nd layer (of an exemplary approximately 500 layers). An end user may optionally return to another view (e.g., semi-transparent isometric), but retain the same controls and layer number slider P01.

As an example, a scenario is carried out in FIG. 10A in the per-layer editing method, where a user wishes to insert a circuit board after removing the build platen 80 from the movable stage. Accordingly, on a layer (layer 122) at which edge supporting structures SS.1 and center supporting structure SS.2 (as seen in FIG. 8A) will have been formed, and/or where a wall w.1 of equivalent height to the circuit board to be inserted will have been formed, the user toggles "pause after layer". It should be noted that the part shown in FIG. 10A is shown with more than the current layer, e.g., with a "show supporting layers" toggle P10 having been activated, presuming that a "mark as supporting layer" P12 has been toggled on a layer below (that layer approximately the thickness of the part to be inserted. Having toggled "pause after layer" at P02, the G-code or instructions for printing will include a pause command, e.g. pausing and presenting the build platen 80 at the position shown in FIG. 8A, and the printer's controller 20 and touchscreen may be used to restart after pausing.

As a further example, an optional continuation of the scenario is carried out in FIG. 10B in the per-layer editing method, where a user has imported an "STL" file corresponding to the part to be inserted (e.g., a circuit board CB) via input and command P08. The mesh or model of the STL may be oriented, located, etc., in a supplemental, 3D, or orthographic rendering in another view (not shown). Having been located in a supported, non-interfering location, and represented in the view panel, the representation of the inserted part CB may be used to apply securing "glue" (e.g., hardened or cured plugs or caps of fill material). In one exemplary implementation, as shown in FIG. 10B, the user may toggle P06 on a "glue pin" feature, whereupon flags for glue locations become available for, e.g., drag and drop operation (seen below the glue pin P06 toggle). When the user identifies the X-Y location of each "glue pin", G-code or an activating code may be rendered to carry out a glue pin operation. A glue pin operation could, for example, (i) check that there is appropriate support or space below the part to be glued to receive a glue pin, and (ii) check that the glue pin will appropriately penetrate the STL inserted. A glue pin GP may be formed, e.g., by extruding or curing material with a shaft and a cap into a columnar hole that is shared by the surrounding 3D part and the inserted part. As shown in FIGS. 10B, 8C, and 8D, 5 glue pins GP are located at corners and center of the inserted STL shape CB.

Further optionally, the pathing and/or toolpath generation for forming the part may use a self-collision algorithm to mark a 3D space occupied by the inserted mesh or STL, and avoid any protrusions CB.1 (As shown in FIGS. 8A-8C) above the inserted part (e.g., protruding circuit or mechanical components), in addition or in the alternative including any glue pin caps. Further optionally, as shown in FIG. 10B, for parts where a glue pin may not appropriate (e.g., a solid panel, or a nut or ferrule to be embedded), or in addition to the glue pins, a "glue STL border" toggle (shown below the glue pin toggle P06) may be activated. In this case, as shown by a double dotted line in FIG. 10B, the pathing and/or toolpath generation for forming the part may skirt the outer border, perimeter, or contour of the inserted STL mesh to secure or weld the corresponding insert part to the encapsulating part being built.

The designation as "glue pin" or "glue border" is exemplary. The glue pin GB or glue border may be formed of and extruded, cured, or otherwise deposited as the same material and by the same print head as, e.g., the fill material applied by print head 18, a continuous fiber material, or a support material. The printer may be equipped with an additional or alternative dedicated glue gun print head to apply, e.g., hot melt adhesive. The print head applying fill material or glue may be shaped as a needle (e.g., at least 3 times as long as it is wide) so as to be insertable into holes. If a needle printhead is insertable in holes, the glue pin or glue border operations may include Z direction movement to fill up a hole or channel from a bottom to the top, then cap at the top.

Figure 11A:
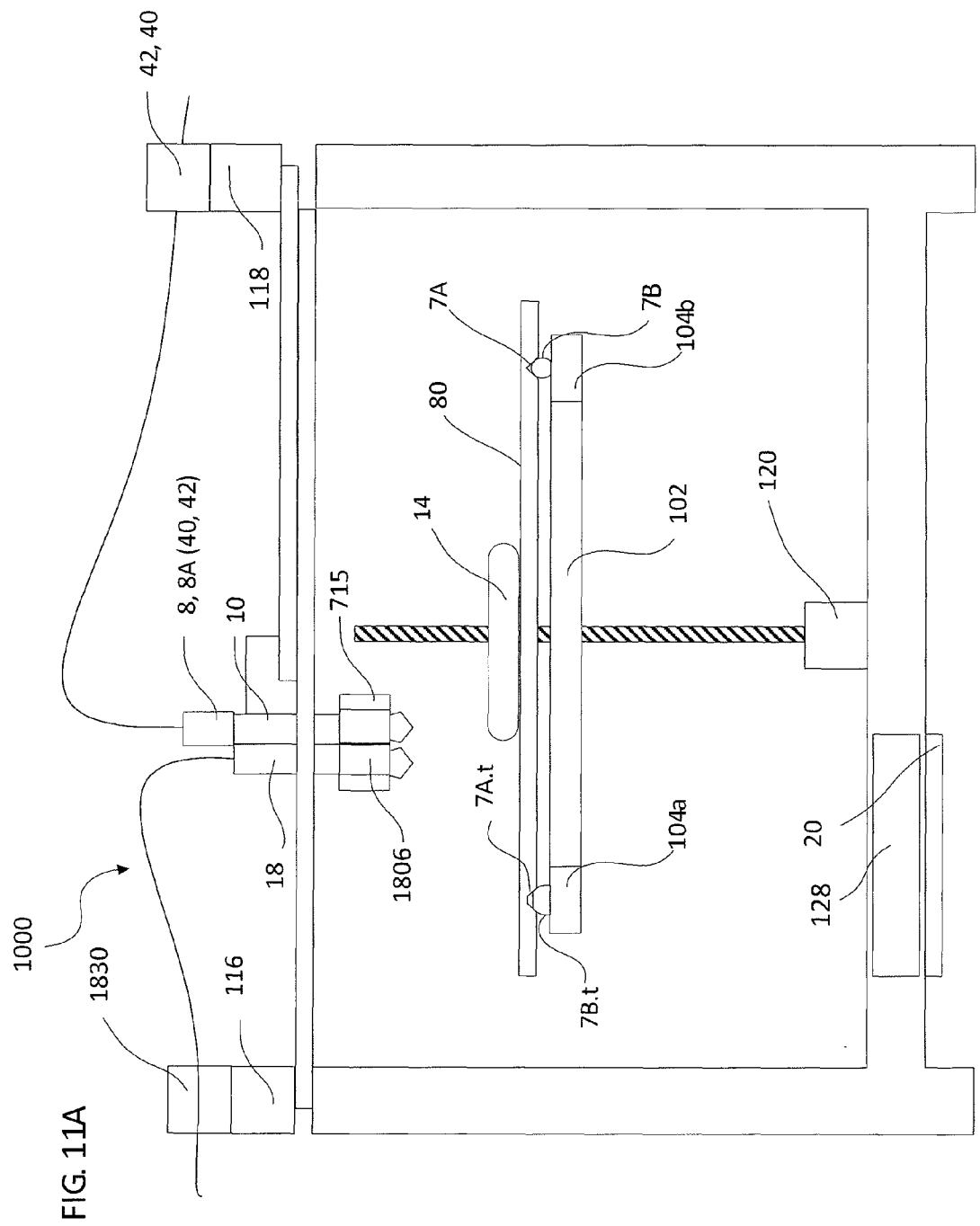

As shown in FIG. 11A, a three dimensional printer may employ two printing approaches—one which applies a fiber reinforced composite filament, and one which applies pure or neat matrix resin (thermoplastic or curing). The fiber reinforced composite filament 2 (also referred to herein as continuous core reinforced filament) may be substantially void free and include a polymer or resin that coats or impregnates an internal continuous single core or multistrand core.

FIG. 11A depicts a movable stage 102 having arms 104*a*, 104*b*. As shown in FIG. 11A, in this example, the protrusions 7B of the kinematic coupling are as an alternative attached to members or flexure members mounted in the arms 104*a*, 104*b* or otherwise in the movable stage 102, while receiving grooves 7A of the kinematic coupling are formed in the build platen 80. Further, as depicted in FIG. 10A, each or any of the semi-spherical or curved protrusions 7A may be formed in truncated or shallow form 7B.t, in which the height of the protrusion is less than the radius of the curve, and/or a flat surface is the most distal portion of the protrusion. Each or any of the curved, straight, three-point, or four-point receiving grooves 7A may also be formed in truncated or shallow form 7A.t, in which the depth of the groove is less than the radius of a curve of a wall, and/or the depth of the groove is less than the depth of a full V formed by angled walls of the receiving groove, and/or the lowermost or deepest portion of the groove is a flat surface. The truncated forms 7A.t and 7B.t permit a true kinematic coupling, or alternatively a quasi-kinematic coupling, to be formed even if the build platen 80 is particularly thin or shallow.

The fiber reinforced composite filament 2 or fill material are fed through a conduit nozzle 10 or nozzle 18 heated (e.g., by a band heater or coil heater) to a controlled temperature selected for the matrix material to maintain a predetermined viscosity, force of adhesion of bonded ranks, and/or a surface finish. In some embodiments, the filament 2 is dragged or pulled through the conduit nozzle 10.

After being heated in the conduit nozzle 10 or nozzle 18 and having the matrix material or polymer 4 and/or fill material substantially melted, the continuous core reinforced filament 2 is applied onto a build platen 80 to build successive layers 14 to form a three dimensional structure. One or both of (i) the position and orientation of the build platen 16 or (ii) the position and orientation of the conduit nozzle 10 are controlled by a controller 20 to deposit the continuous core reinforced filament 2 in the desired location and direction. Position and orientation control mechanisms include gantry systems, robotic arms, and/or H frames, any of these equipped with position and/or displacement sensors to the controller 20 to monitor the relative position or velocity of conduit nozzle 10 relative to the build platen 16 and/or the layers 14 of the part being constructed. The controller 20 may use sensed X, Y, and/or Z positions and/or displacement or velocity vectors to control subsequent movements of the conduit nozzle 10 or platen 16. For example, the three dimensional printer 1000 may include displacement, velocity, or acceleration transducers in any of three translation and/or three rotation axes detecting a position or movement of the conduit nozzle 10 relative to the build platen 16. A range measurement sensor may scan the section ahead of the conduit nozzle 10 in order to correct the Z height of the conduit nozzle 10, or the fill volume required, to match a desired deposition profile.

The three dimensional printer 1000 may include a cutter 8 controlled by the controller 20 that cuts the continuous core reinforced filament (e.g., without the formation of tails) during the deposition process in order to (i) form separate features and components on the structure as well as (ii) control the directionality or anisotropy of the deposited material and/or bonded ranks in multiple sections and layers. FIG. 11A also depicts at least one secondary print head 18 optionally employed with the three dimensional printer 1000 to print, e.g., protective coatings on the part including 100% resin FFF extrusion, a UV resistant or a scratch resistant coating.

As depicted in FIG. 11A, upstream of a driven roller 42 and an idle roller 40, a spool (not shown) supplies under mild tension an unmelted void free fiber reinforced composite filament. The filament including at least one axial fiber strand extending within a matrix material of the filament, having no substantial air gaps within the matrix material. In this example, the fiber reinforced composite filament 2 includes a nylon matrix that impregnates hundreds or thousands of continuous carbon fiber strands.

The driven roller 42 and an idle roller 40 feed or push the unmelted filament at a feed rate (optionally variably controllable by the controller 20, optionally less than the printing rate, and optionally a differential between the feed and printing rates absorbed by a one-way bearing), along a clearance fit zone that prevents buckling of filament.

Initially, in a threading stage, the melted matrix material and the axial fiber strands of the filament 2 are pressed into the part with axial compression, and as the build platen and print head are translated with respect to one another, the end of the filament contacts the ironing lip of the printhead 715 and is subsequently continually ironed in a transverse pressure zone to form bonded ranks in the part 14.

The printing head or conduit nozzle or nozzle or the build platform 16 may be translated, e.g., the feed rate and/or the printing rate are controlled to maintain compression in the filament in the threading stage, and to maintain neutral to positive tension in the printing operation. The matrix material of the filament 2 may be heated and melted in the non-contact zone (in particular, so that there is less opportunity to stick to the walls of the conduit nozzle), but is in this embodiment generally melted or liquefied at the ironing lip or tip. The feed and printing rates may be monitored or controlled to maintain compression, neutral tension, or positive tension within the unsupported zone as well as primarily via axial compressive or tensile force within fiber strand(s) extending along the filament.

Figure 11B:
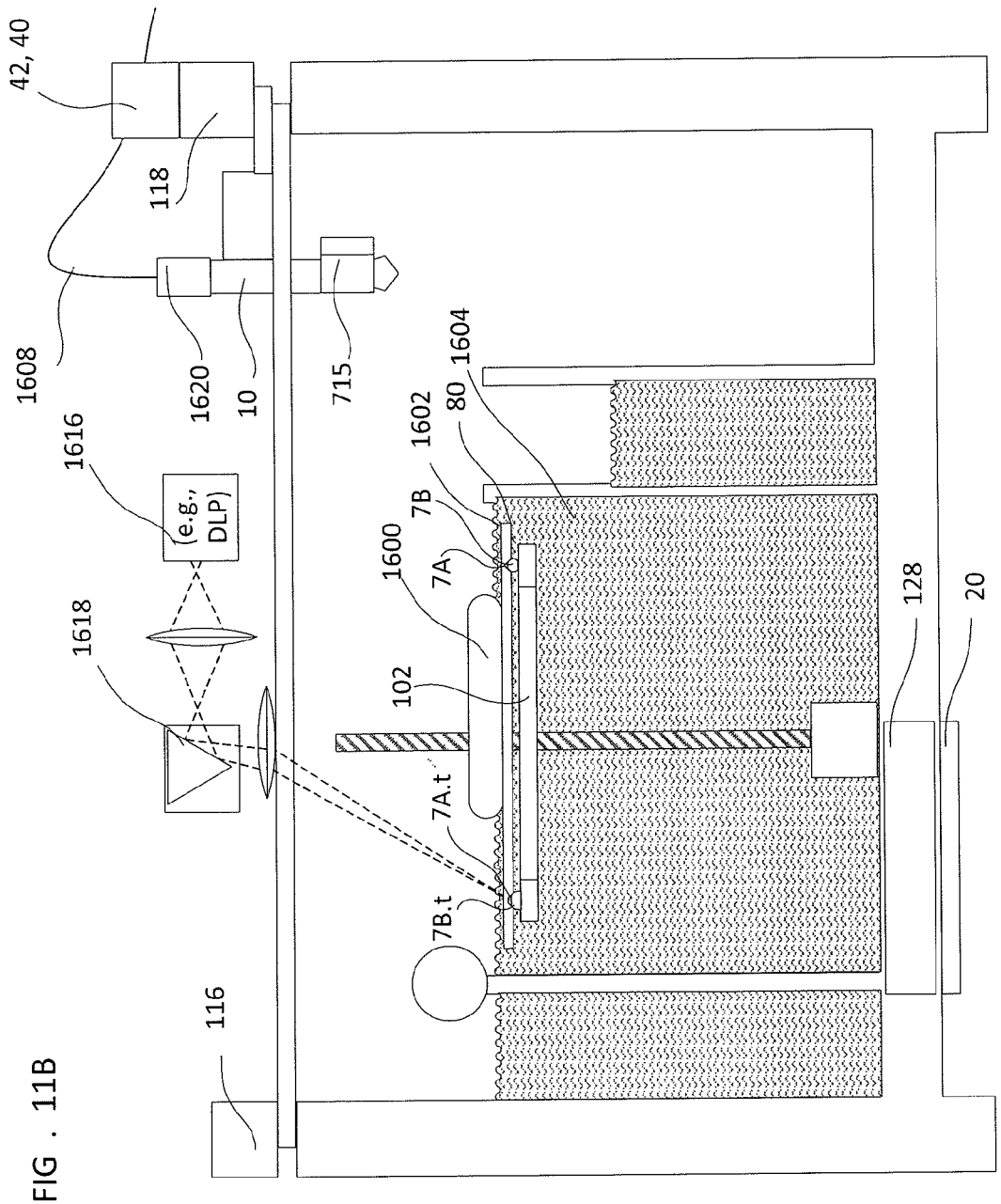

FIG. 11B depicts an embodiment of a three dimensional printer in applying a fiber reinforced composite filament 2 together with DLP-SLA, SLA, or SSS to build a structure. Like numbered features are similar to those described with respect to FIG. 11A.

FIG. 11B depicts a hybrid system employing stereolithography (and/or selective laser sintering) to provide the matrix about the embedded fiber, i.e. processes in which a continuous resin in liquid or powder form is solidified layer by layer by sweeping a focused radiation curing beam (laser, UV) in desired layer configurations. In order to provide increased strength as well as the functionalities associated with different types of continuous core filaments including both solid and multistrand materials, the stereolithography process associated with the deposition of each layer can be modified into a two-step process that enables construction of composite components including continuous core filaments in desired locations and directions. A continuous core or fiber may be deposited in a desired location and direction within a layer to be printed, either completely or partially submerged in the resin. After the continuous fiber is deposited in the desired location and direction, the adjoining resin is cured to harden around the fiber. This may either be done as the continuous fiber is deposited, or it may be done after the continuous fiber has been deposited. In one embodiment, the entire layer is printed with a single continuous fiber without the need to cut the continuous fiber. In other embodiments, reinforcing fibers may be provided in different sections of the printed layer with different orientations. In order to facilitate depositing the continuous fiber in multiple locations and directions, the continuous fiber may be terminated using a cutter as described herein, or by the laser that is used to harden the resin.

FIG. 11B depicts a part 1600 being built on a platen 1602 using stereolithography (SLA) or selective layer sintering (SLS). The part 1600 is immersed in a liquid resin (photopolymer) material 1604 or meltable powder 1604 contained in a tray 1606. During formation of the part 1600, the platen 1602 is moved by a layer thickness to sequentially lower after the formation of each layer to keep the part 1600 submerged. During the formation of each layer, a continuous core filament 1608 is fed through a conduit nozzle 715 and deposited onto the part 1600. The conduit nozzle 715 is controlled to deposit the continuous core filament 1608 in a desired location as well as a desired direction within the layer being formed. The feed rate of the continuous core filament 1608 may be equal to the speed of the conduit nozzle 715 to avoid disturbing the already deposited continuous core filaments. As the continuous core filament 1608 is deposited, appropriate electromagnetic radiation (e.g., laser) cures the resin surrounding the continuous core filament 1608 in a location behind the path of travel of the conduit nozzle 715. The distance between the location and the conduit nozzle 715 may be selected to allow the continuous core filament to be completely submerged within the liquid resin prior to curing. The laser is generated by a source 1616 and is directed by a controllable mirror 1618. The three dimensional printer also includes a cutter 1620 to enable the termination of the continuous core filament as noted above.

What is claimed is:

1. A three dimensional printer, comprising:
    a non-square rectangular build platform for receiving a part deposited by a three dimensional printing process;
    a movable stage supporting the build platform;
    a kinematic coupling between the build platform and movable stage which holds said build platform, comprising:
        three curved protrusions attached to one of the build platform or the movable stage;
        six locating features formed in receivers of the remaining one of the build platform and the movable stage, providing for six points of contact between the curved protrusions and the locating features; and
        at least two flexures, one flexure operative with respect to each of two of the three curved protrusions attached to differentially change a Z position of at least one of the points of contact;
    a print pause circuit that pauses three dimensional printing;
    a completion level detection circuit that responds to a preset level of completion of a part to activate the print pause circuit;
    removal circuit that responds to the print pause circuit to present the build platform to be removed;
    a print resume circuit that resumes printing of additional printed layers; and
    a return detection circuit that responds to an input associated with the return of the build platform to activate the print resume circuit,
    wherein the three curved protrusions are arranged in a non-equilateral triangle in a plane about the perimeter of the non-square rectangular build platform such that one side of the triangle is longer than the remaining two.

2. The three dimensional printer according to claim 1, wherein
    each of the three curved protrusions comprises at least part of a semi-sphere.

3. The three dimensional printer according to claim 1, wherein
    the six locating features comprise three two-point locating features.

4. The three dimensional printer according to claim 3, wherein at least one of the six points of contact is oriented in a direction other than perpendicular to a centroid of a coupling triangle among the three curved protrusions.

5. The three dimensional printer according to claim 1, wherein
    the six locating features comprise one three or more point locating feature, one two point locating feature, and one single point locating feature.

6. The three dimensional printer according to claim 1, wherein each of the three curved protrusions is arranged to be, in a coupled position, no more than substantially ½ mm from a rare earth magnet arranged among the six locating features, each rare earth magnet having a pulling force gradient over 5 mm distance from 0 to 0.2 lb. of force at 5 mm to 1 to 3 lb. of three at contact, the rare earth magnet pulling the protrusions into a preload condition and giving tactile and auditory feedback by emphasizing a contact impact as a click.

7. The three dimensional printer according to claim 6, wherein the protrusions are held in the preload condition by gravity in addition to by the rare earth magnets.

8. The three dimensional printer according to claim 1, where each of the three curved protrusions attached to one of the build platform or the movable stage is configured and arranged to mate with, upon the remaining one of the build platform or the movable stage, a grooved receiving member having two coupling surfaces joined by two guiding surfaces, the two coupling surfaces being locating features providing two points of contact, and the two guiding surfaces being approximately perpendicular and adjacent to the two coupling surfaces.

9. A method of performing multi-step operations on an article with a 3D printer, comprising:
    receiving a non-square rectangular build platform on a movable stage;
    locating the build platform to the movable stage with a six point contact alignment between three curved protrusions and six locating features, wherein the three curved protrusions are arranged in a non-equilateral triangle in a plane about the perimeter of the non-square rectangular build platform such that one side of the triangle is longer than the remaining two;
    constraining movement of at least two of the three curved protrusions using at least two individual flexures each constructed to flex two leaves in parallel to constrain movement of a corresponding one of the three curved protrusions to move substantially only in the Z height direction;
    holding the build platform on the movable stage to the kinematic coupling;
    receiving printed layers of the article on the build platform;
    checking, with a completion level detection circuit, whether the 3D printed layers of the article have reached a preset level of completion
    pausing, with a print pause circuit, the receiving of 3D printed layers when the preset level of completion is reached;
    presenting, with a removal circuit, the build platform to be removed;
    removing the build platform from the six point contact alignment for operations outside the movable stage;
    returning the build platform to the six point contact alignment following the operations outside the movable stage;

detecting, with a return detection circuit, the return of the build platform to the six point and contact alignment; and resuming, with a print resume circuit, 3D printing of additional layers without further adjusting the Z height of any of the three curved protrusions.

10. The method according to claim 9, further comprising: leveling the build platform by adjusting a Z height of the at least two of the three curved protrusions.

11. The method according to claim 9, further comprising: reindexing the build platform to a Cartesian origin in at least two of X, Y, and Z directions before resuming the 3D printing of additional layers without further adjusting the Z height of any of the three curved protrusions.

12. The method according to claim 9, further comprising: receiving a functional insert;

receiving data representative of a location of gluing operations which deposit material to affix a functional insert to the article;

depositing material in the location of gluing operations to affix the functional insert to the article; and continuing to receive printed layers of the article on the build platform.

13. The method according to claim 9, further comprising:

receiving a functional insert;

receiving data representative of printing instructions which deposit material to overmold the functional insert; and continuing to receive printed layers of the article on the build platform.

14. The method according to claim 9, further comprising:

forming at least one layer in the shape of one of an inner or an outer contour of a functional insert;

guiding the functional insert;

receiving a functional insert;

depositing material adjacent the shape of one of an inner or an outer contour of the functional insert.

* * * * *